United States Patent
Zhang et al.

(10) Patent No.: US 10,565,034 B2
(45) Date of Patent: Feb. 18, 2020

(54) EVENT-DRIVEN SERVERLESS FUNCTION ORCHESTRATION

(71) Applicant: Futurewei Technologies, Inc., Plano, TX (US)

(72) Inventors: Hong Zhang, Palo Alto, CA (US); Henry Fourie, Livermore, CA (US); Farhad Sunavala, San Ramon, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 16/194,114

(22) Filed: Nov. 16, 2018

(65) Prior Publication Data
US 2019/0205186 A1   Jul. 4, 2019

Related U.S. Application Data

(63) Continuation-in-part of application No. 15/858,359, filed on Dec. 29, 2017.

(51) Int. Cl.
| | |
|---|---|
| *G06F 3/00* | (2006.01) |
| *G06F 9/44* | (2018.01) |
| *G06F 9/46* | (2006.01) |
| *G06F 13/00* | (2006.01) |
| *G06F 9/54* | (2006.01) |

(52) U.S. Cl.
CPC .................................... *G06F 9/542* (2013.01)

(58) Field of Classification Search
CPC ...................................................... G06F 9/542
USPC ........................................................ 719/318
See application file for complete search history.

(56) References Cited

U.S. PATENT DOCUMENTS

| | | |
|---|---|---|
| 2006/0212592 A1 | 9/2006 | Gupta et al. |
| 2013/0329632 A1 | 12/2013 | Buyukkoc et al. |
| 2018/0150529 A1 | 5/2018 | McPherson et al. |
| 2018/0302277 A1 | 10/2018 | Shimamura et al. |

FOREIGN PATENT DOCUMENTS

| | | |
|---|---|---|
| CN | 103220180 A | 7/2013 |
| CN | 107148767 A | 9/2017 |
| EP | 1248441 A2 | 10/2002 |

(Continued)

OTHER PUBLICATIONS

AWS Step Functions Developer Guide, Release 1.0, Amazon Web Services. Mar. 21, 2017, 100 pages.

(Continued)

*Primary Examiner* — Timothy A Mudrick
(74) *Attorney, Agent, or Firm* — Schwegman Lundberg & Woessner, P.A.

(57) ABSTRACT

The disclosure relates to technology for coordinating execution of serverless functions. One or more events are received from one or more event sources. The one or more events are mapped to one or more event states of a function graph according to a mapping rule, the one or more event states including one or more actions, and the one or more actions which satisfied the mapping rule are executed. The received events are sent to a computer system to trigger the computer system initiating one or more computing resource groups for executing one or more serverless functions associated with the one or more actions. One or more responses are received from the serverless functions.

21 Claims, 17 Drawing Sheets

(56) References Cited

FOREIGN PATENT DOCUMENTS

WO 2016070108 A1 5/2016

OTHER PUBLICATIONS

"European Application No. 18882265.4, Extended European Search Report dated Nov. 7, 2019", (dated Nov. 7, 2019), 9 pgs.
Baldini, Ioana, et al., "Serverless Computing: Current Trends and Open Problems", ARXIV.org, Cornell University Library, 201 Olin Library, Cornell University, Ithaca, NY, XP080768870, (Jun. 10, 2017), 20 pgs.

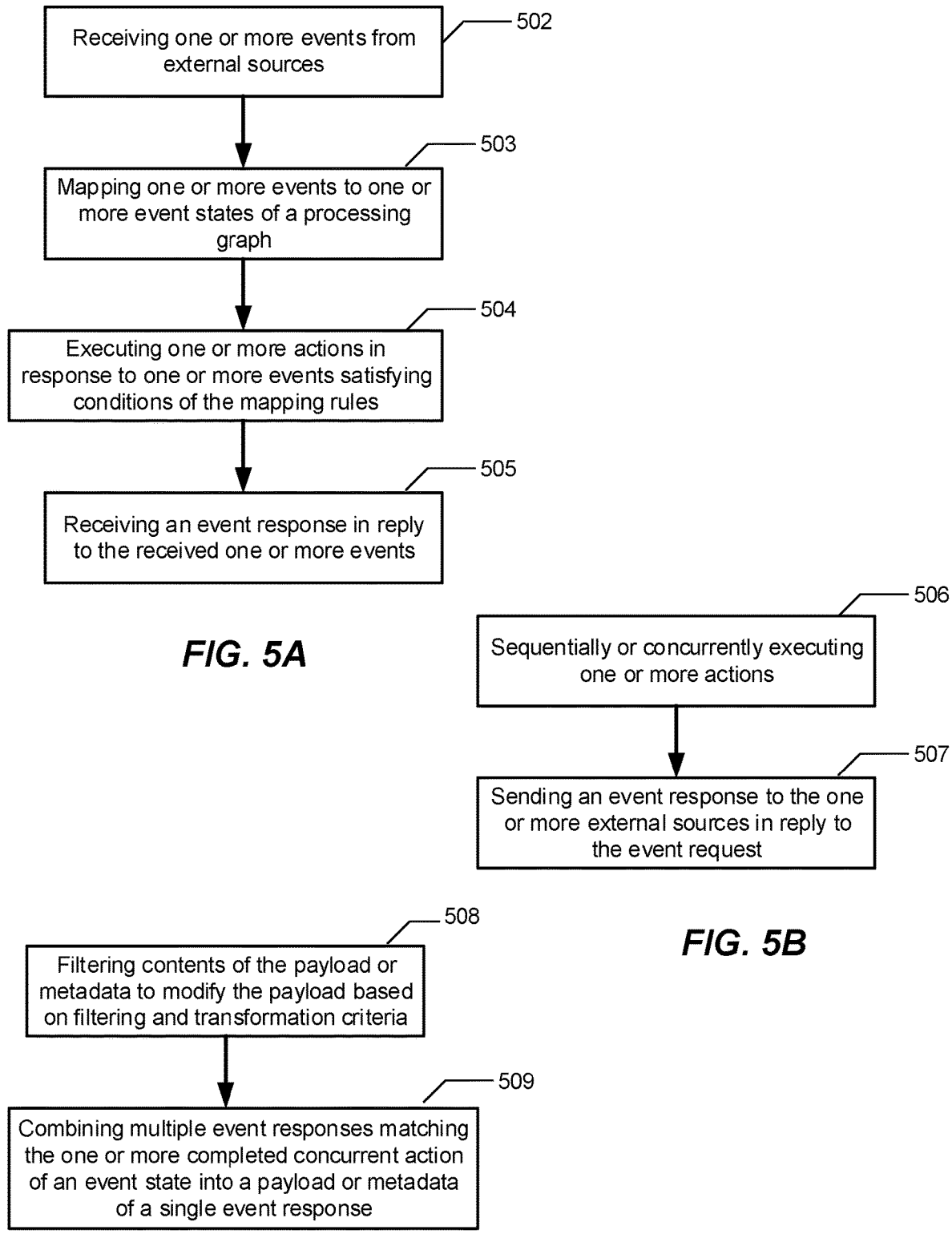

EVENT-DRIVEN SERVERLESS FUNCTION ORCHESTRATION

FIELD

The disclosure generally relates to coordinating execution of serverless functions, and in particular, mapping events from external sources to serverless functions.

BACKGROUND

Cloud computing refers to the use of dynamically scalable computing resources accessible via a network, such as the Internet. The computing resources, often referred to as a "cloud," provide one or more services to users. These services may be categorized according to service types, which may include for examples, applications/software, platforms, infrastructure, virtualization, and servers and data storage. The term "cloud-based services" or, more simply, "cloud services" refers not only to services provided by a cloud, but also to a form of service provisioning in which cloud customers contract with cloud service providers for the online delivery of services provided by the cloud. Cloud service providers manage a public, private, or hybrid cloud to facilitate the online delivery of cloud services to one or more cloud customers.

Serverless functions are one example of services in which individual code functions are executed in the cloud. This differs from a virtual machine (VM) service in which the compute environment consists of entire VM instances. Serverless functions alleviate the need for the user to deploy and manage physical servers on which these functions execute. In addition, users are only billed for the actual execution time of each Serverless function instance and not for idle time of the physical servers and VM instances. Another benefit is continuous scaling of function instances to address varying traffic load.

BRIEF SUMMARY

According to one aspect of the present disclosure, there is provided a method for coordinating execution of serverless functions, including receiving one or more events from one or more external sources; mapping the one or more events to one or more event states of a processing graph according to mapping rules, the one or more event states including one or more actions; executing the one or more actions in response to the one or more events satisfying conditions of the mapping rules; and receiving an event response in reply to the received one or more events, the event response based on execution of one or more tasks corresponding to a sequence of the executed one or more actions.

Optionally, in any of the preceding aspects, the one or more external events are asynchronous or synchronous.

Optionally, in any of the preceding aspects, the method further sequentially or concurrently executing the one or more actions by the one or more event states, wherein each of the one or more actions invokes a corresponding serverless function such that a data package included in the event is passed to the corresponding serverless function for execution. The data package may include a payload and/or a metadata.

Optionally, in any of the preceding aspects, the method further includes sending an event response to the one or more external sources from which the one or more events originated upon completion of executing the sequence of the one or more actions.

Optionally, in any of the preceding aspects, the event response includes a single payload or metadata for the sequentially executed one or more actions.

Optionally, in any of the preceding aspects, the event response includes a combined payload or metadata for the concurrently executed one or more actions.

Optionally, in any of the preceding aspects, the method further includes filtering contents of the payload or metadata to modify the payload or metadata based on filtering and transformation criteria; and combining multiple event responses matching the one or more completed concurrent actions of an event state into a payload or metadata of a single event response.

Optionally, in any of the preceding aspects, the method further includes independently executing a subset of the one or more actions.

Optionally, in any of the preceding aspects, one or more subsets are nested to define a combination of sequentially and concurrently executed one or more actions.

Optionally, in any of the preceding aspects, in response to the one or more external events not being received, a timeout occurs after a predetermined period of time.

According to one aspect of the present disclosure, there is provided a device for coordinating execution of serverless functions, comprising a non-transitory memory storage comprising instructions; and one or more processors in communication with the memory, wherein the one or more processors execute the instructions to receive one or more events from one or more external sources; map the one or more events to one or more event states of a function graph according to mapping rules, the one or more event states including one or more actions; execute the one or more actions in response to the one or more events satisfying conditions of the mapping rules; and receive an event response in reply to the received one or more events, the event response based on execution of one or more tasks corresponding to a sequence of the executed one or more actions.

According to one other aspect of the present disclosure, there is provided a non-transitory computer-readable medium storing computer instructions for a non-transitory computer-readable medium storing computer instructions for coordinating execution of serverless functions, that when executed by one or more processors, cause the one or more processors to perform the steps of receiving one or more events from one or more external sources; mapping the one or more events to one or more event states of a function graph according to mapping rules, the one or more event states including one or more actions; executing the one or more actions in response to the one or more events satisfying conditions of the mapping rules; and receiving an event response in reply to the received one or more events, the event response based on execution of one or more tasks corresponding to a sequence of the executed one or more actions.

According to one aspect of the present disclosure, there is provided a method for coordinating execution of serverless functions, including receiving an event from an event source; mapping the event to an event state of a function graph according to a mapping rule; executing one or more actions of the event state satisfying the mapping rule; sending a data package of the event to a computer system to trigger the computer system initiating one or more computing resource groups for executing one or more serverless functions associated with the one or more executed actions; receiving one or more responses based on execution of the one or more serverless functions; and performing a next state of the function graph following the event state. The data package of the event may be a payload of the event, or metadata of the event, or both.

Optionally, in any of the preceding aspects, the event state includes an expression of event definition which indicates a combination of one or more events as a trigger condition of the one or more actions of the event state.

Optionally, in any of the preceding aspects, the expression of event definition is a Boolean expression.

Optionally, in any of the preceding aspects, the event definition defines a combination of two or more events as the trigger condition, the one or more actions of the event state satisfying the mapping rule are executed after the two or more events are received.

Optionally, in any of the preceding aspects, the event state is not the first state in the function graph.

Optionally, in any of the preceding aspects, the method further comprising: releasing the one or more units of computing resources in response to the completion of the one or more serverless functions.

Optionally, in any of the preceding aspects, the function graph may Inform the computer system to release the one or more units of computing resources after the completion of the one or more serverless functions; or, the computer system monitors the execution of the serverless functions and releases the one or more units of computing resources after the completion of the one or more serverless functions.

According to another aspect of the present disclosure, there is provided a device for coordinating execution of serverless functions, comprising a non-transitory memory storage comprising instructions; and one or more processors in communication with the memory, wherein the one or more processors execute the instructions to: receive an event from an event source; map the event to an event state of a function graph according to a mapping rule, the event state including one or more actions; execute one or more actions of the event state satisfying the mapping rule; send a payload and/or metadata of the event to a computer system to trigger the computer system initiating one or more units of computing resources for executing one or more serverless functions associated with the one or more executed actions; receive one or more responses based on execution of the one or more serverless functions; and perform a next state of the function graph following the event state.

According to another aspect of the present disclosure, there is provided a non-transitory computer-readable medium storing computer instructions for coordinating execution of serverless functions, that when executed by one or more processors, cause the one or more processors to perform the steps of: receiving an event from an event source; mapping the event to an event state of a function graph according to a mapping rule, the event state including one or more actions; executing one or more actions of the event state satisfying the mapping rule; sending a payload and/or metadata of the event to a computer system to trigger the computer system initiating one or more units of computing resources for executing one or more serverless functions associated with the one or more executed actions; receiving one or more responses based on execution of the one or more serverless functions; and performing a next state of the function graph following the event state.

According to another aspect of the present disclosure, there is provided a system for coordinating execution of serverless functions, comprising a Function Graph Controller (FGC) and a serverless function manager, wherein the FGC, configured to: receive an event from an event source; map the event to an event state of a function graph according to a mapping rule, the event state including one or more actions; execute one or more actions of the event state satisfying the mapping rule; send a payload and/or metadata of the event to a computer system to trigger the computer system initiating one or more units of computing resources for executing one or more serverless functions associated with the one or more executed actions; receive one or more responses based on execution of the one or more serverless functions; perform a next state of the processing graph following the event state; the serverless function manager, configured to: initiate one or more units of computing resources for executing the one or more serverless functions associated with the one or more executed actions; and send one or more responses to the one or more actions of the event state in response to the execution of the one or more serverless functions.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate elements.

FIG. 5A-5C illustrate flow diagrams in accordance with the disclosed embodiments.

DETAILED DESCRIPTION

Figure 1:
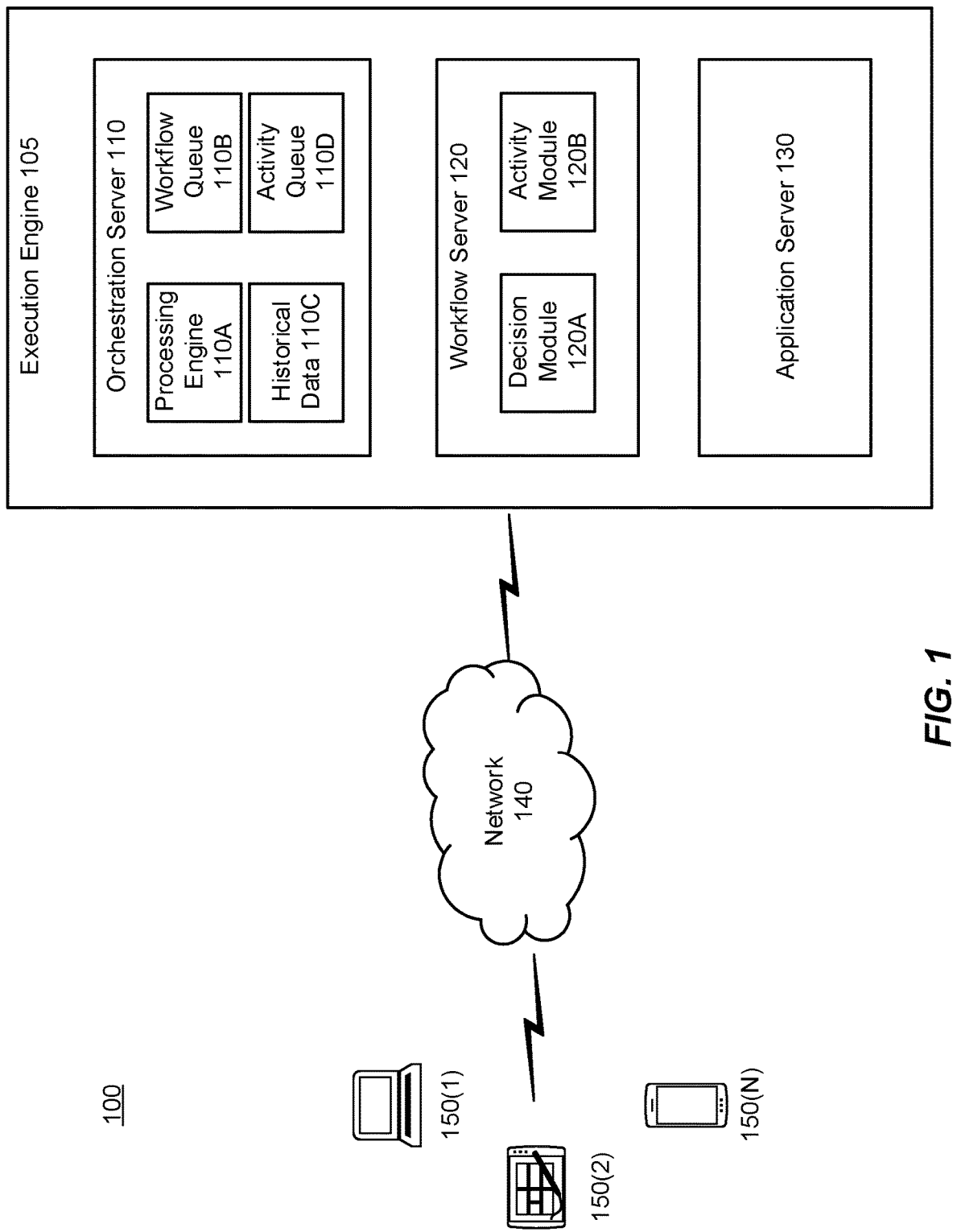
FIG. 1 illustrates an example network including an execution engine performing workflow processing.

The disclosure relates to technology for coordinating execution of serverless functions, and in particular, to coordinating execution of serverless functions by mapping events from external sources to the serverless functions using function graphs.

An event-driven architecture is a framework that orchestrates behavior around the production, detection and consumption of events, as well as the responses they evoke. An event may be any identifiable occurrence that has significance for system hardware or software. Typically, an event-driven architecture consists of event creators, which is the source of the vent, and event consumers, which are entities that become aware of an event occurrence and often process the events.

Function graphs within the event-driven architecture can orchestrate serverless functions (i.e., cloud functions) to control execution of the functions for a wide variety of application use cases, such as business logic, healthcare management and the like. Function graphs can be viewed as a collection of states and the transitions and branching between these states, which may be invoked by command or triggered dynamically on arrival of an event from an event source. The function graphs also enable the arrangement of the functions to be executed in sequence or concurrently, manage error conditions and handle scaling to accommodate varying event load.

An event from an event source may be associated with a specific event state within a function graph. These event states within a function graph will wait for the arrival of events from the specific event source before performing one or more associated actions and progressing to the next state. Accordingly, the function graphs may define states at which to wait before executing the serverless function actions and progressing through the function graph before ultimately transitioning to the next state.

In one embodiment, an event processing server or controller within the event-driven architecture allows for the instantiation and dispatch of multiple function graphs as needed. As events arrive at the event processing server, a set of rules map the events to the function graphs for processing.

In one other embodiment, the function graphs provide a mechanism to transform the event payload as the payload progresses through the function graphs.

It is understood that the present embodiments of the disclosure may be implemented in many different forms and that claims scopes should not be construed as being limited to the embodiments set forth herein. Rather, these embodiments are provided so that this disclosure will be thorough and complete and will fully convey the inventive embodiment concepts to those skilled in the art. Indeed, the disclosure is intended to cover alternatives, modifications and equivalents of these embodiments, which are included within the scope and spirit of the disclosure as defined by the appended claims. Furthermore, in the following detailed description of the present embodiments of the disclosure, numerous specific details are set forth in order to provide a thorough understanding. However, it will be clear to those of ordinary skill in the art that the present embodiments of the disclosure may be practiced without such specific details.

FIG. 1 illustrates an example network including an execution engine performing workflow processing. The network 100 includes an execution engine 105 that operates in a distributed computing environment including several computer systems that may be interconnected using, for example, one or more computer networks (not shown). The execution engine 105 includes an orchestration server 110, a processing server 120 and an application server 130, which together are connectable to one or more end user devices 150(1)-(N) via network 140. In one embodiment, the functional components executed in the servers 110, 120 and 130 can be executed within a single server or the same pool of servers.

The orchestration server 110 includes a processing engine 110A, workflow queue(s) 110B, historical data 110C and activity queue(s) 110D. The processing engine 110A can be executed to orchestrate the execution of various workflow instances. Implementation of a workflow instance can involve placement of a workflow, or data related to a workflow, in the workflow queue 110B. Each workflow queue 11B may correspond to a different type of workflow, a different workflow server 120, a combination thereof, or any other logical separation of queued workflows, including those determined by load balancing techniques, etc.

The processing engine 110A can be a computer executable program or collection of programs. In one embodiment, the processing engine is associated with the historical data 110C to assist in orchestration. The historical data 110C may include, for example, a list of events that have occurred during the implementation of a given workflow instance over time. The events listed can include activities executed on behalf of the workflow instance, such as the scheduling of an activity, the execution of an activity, the completion of an activity, the starting or stopping of a timer, etc. The historical data 110C can be stored in an electronic data store, such as a memory, database, hard disk, etc.

The components implemented on the workflow server 120 can include decision module 120A and activity module 120B. Workflow definitions may be embodied in functional code in the decision modules 120A and can be configured to identify the activities, actions, or steps to be performed for a specific workflow instance based upon the functional expression of a workflow definition. For example, each decision module 120A can embody a workflow definition in the form of functional logic as may be expressed, for example, in terms of programmed code, such as Java or C++.

Activity modules 120B can be executed to perform one or more actions, tasks, or functions that include at least a portion of a workflow instance based upon a command from a decision module 120A. The activity modules 120B can be implemented as Java classes that are each instantiated multiple times in order to handle the workflow processing load from the decision modules 120A. An activity queue 120B on the orchestration server 110 can be associated with each type or class of activity module 120B. In response to a decision module 120A issuing a command to execute an activity module 120B, the processing engine 110A can place the command in the activity queue 110D to be executed by the corresponding activity module 120B The network 140 can be any wired network, wireless network or combination thereof. In addition, the network 140 can be a personal area network, local area network, wide area network, cable network, satellite network, cellular telephone network, the Internet, etc., or any combination thereof. Each of the workflow orchestration server 110, workflow processing server 120, and application server 130 can be a physical computing device configured to execute software applications. In some embodiments, the servers 110, 120, 130 can be configured to execute one or more software applications on the same single physical or virtual device, across multiple physical/virtual devices, or any combination thereof.

The end-user devices 150(1)-(N) can communicate with the various components of the execution engine 105 over the network 140. The end-user devices 150(1)-(N) are not limited to those depicted and can be any of a number of computing devices that are capable of communicating over a network including, but not limited to, a laptop, personal computer, personal digital assistant (PDA), hybrid PDA/ mobile phone, mobile phone, electronic book reader, digital media player, tablet, head mounted display devices, and the like.

In operation, the orchestration server 110 can receive notification of an event from the application server 130 or an end-user device 150(1)-(N). In response, the orchestration server 110 loads a new instance of a workflow into a workflow queue 110B. In some embodiments, the specific workflow instantiated in response to the event can depend based on the event, with various events associated with different workflows, etc. The workflow server 120 can be configured to poll the workflow orchestration server 110 for queued workflows to process, and can receive information about queued workflows that the workflow server 120 is configured to process.

Processing a workflow can involve determining which activity or activities to execute or schedule for execution based on the current event. Each time the workflow processing server 120 processes an activity, it can generate a command, raise an error, or otherwise initiate a notification to the workflow orchestration server 110, which the workflow orchestration server 110 can save as historical data 110C. In some embodiments, the command can be an instruction to execute a program or routine, to start or stop a timer, to send a message to another component or an external process, etc. The workflow process can then be queued for further processing.

Figure 2:
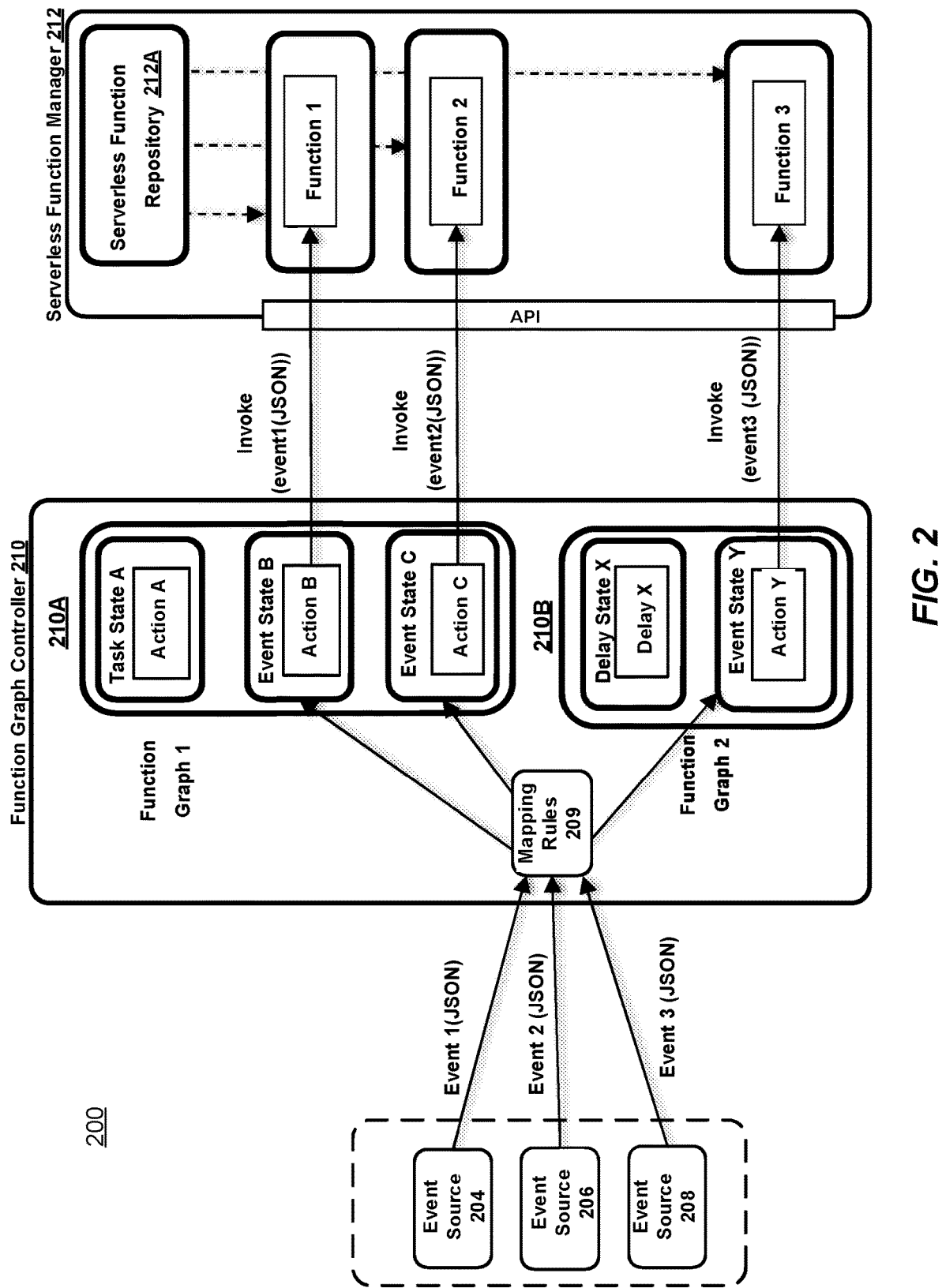
FIG. 2 illustrates an example event-driven orchestration system.

FIG. 2 illustrates an example event-driven orchestration system. Event-driven orchestration system 200 may include one or more event different sources 204, 206, 208, an Function Graph Controller (FGC) 210 (also referred to herein as an Function Graph Orchestrator) that is configured to provide an environment for processing events from the event sources 204, 206, 208. The event sources 204, 206, 208 generate events that are received by FGC210. For example, FGC 210 receives events 1, 2 and 3 from event sources 204, 206 and 208, respectively. In one embodiment, each of events 1, 2 and 3 include an event request comprising a payload, such as a JavaScript Object Notation (JSON) payload. JSON payloads are represented in FIG. 2 as J1-J5, and discussed in more detail below. It is appreciated that any type of payload may be employed and the disclosure is not limited to JSON payloads.

One or more event processing applications may be deployed on and be executed by FGC 210. In one embodiment, the event processing applications executed by FGC 210 may be configured to listen for one or more events, process the events 1, 2 and 3 based upon processing logic (e.g., mapping rules 209) that selects one or more events 1, 2 and 3 received from the event sources 204, 206 and 208. In one other embodiment, processing applications may be implemented as a state machine, such as state machine 210A, which in turn implement workflows that invoke cloud services or functions (also referred to as microservices).

State machines may be represented as a function or service graph, such as function graphs 1 and 2. Each function graph may include, for example, states, events, actions and action results. States may have various and different behaviors, such as a delay state, a switch state, an event state, an operation state and a NoOp state. For example, the delay state causes the function graph execution to wait for a specified duration, the switch state permits transitions to multiple other states based on the contents of the payload, the operation state allows the execution of one or more serverless functions and specifies a list of actions to be executed. Additionally, the event state allows for handling of events from different event sources and specifies a list of event-expression structures that are used to match incoming events. In one embodiment, the first event to match an "event-expression" (Boolean expression) for the state will cause actions for the "event-expression" to be executed followed by a transition to the next state ("event-expressions" are discussed below). Finally, the end state terminates the state machine and reports the status, and the NoOp state is a pass-through state.

Each event state has a list of one or more actions which may be executed. Each action performs the execution of a serverless function. In one embodiment, the one or more actions can be executed in sequence. In another embodiment, the one or more actions may be executed in parallel. In still another embodiment, the actions may be executed as any combination of sequential and/or parallel actions. For each action, there is a list of action results that handle the result of the action, such as retry handling, next state transitions and function graph termination. In one embodiment, the function graph is defined in JavaScript Objection Notation (JSON), as described below, although it is not limited to such a language. Other languages, such as YAML, XML and the like may also be employed.

Event-driven applications may be rule-driven (e.g., by mapping rules 209), where the rules may be communicated as an expression used to process the received events. The expressions may include, for example, instructions that identify the processing to be performed for the received events. For example, the expressions may be formed as: event→function graph [/state]. As will become apparent from the examples discussed below, the expression may also perform filtering and merging (or aggregation) functions to transform and extract particular data from the received events.

More specifically, as events 1, 2 and 3 are mapped from event sources 204, 206 and 208, into the state machines 210A and 210B, the event states B, C and Y are triggered to thereby execute one or more associated actions by the event processing applications. For example, in the depicted embodiment, the mapping rules for each of events 1, 2 and 3 may be expressed as follows: Event 1→Function Graph1/state B→Function 1; Event 2→Function Graph1/state C→Function 1; and Event 3→Function Graph 2/state Y. Accordingly, the event processing applications may include instructions for causing a computing device to perform one or more of actions B, C and Y for a corresponding event 1, 2 and 3.

In one embodiment, FGC 210 employs the state machines 210A and 210B to implement workflows that invoke the serverless function associated with a particular action. For example, in the case of an event sent by event source 204, event 1 is received at the FGC 210 and directed by the mapping rules 209 to forward the payload associated with event 1 to event state B of function graph 1. At event state B, action B is processed by the function graph controller which in turn invokes a serverless function (e.g., function 1) in the serverless function manager 212.

In one embodiment, the functions may be stored in repository 212A and deployed in separate containers for isolation and modularity, while also providing enhanced quality and reliability with integrated testing, logging, monitoring, and diagnostic strategies.

Each function will be understood to include a software application (e.g., service) that is comprised of a plurality of independently deployable services. These functions represent serverless functions that may also be broken down into smaller services (microservices) organized, for example, around business capability (e.g., API engine, REST interfaces, socket connection, monitoring, and notifications).

It should be appreciated that event-driven orchestration system 200 depicted in FIG. 2 may have other components than those illustrated and that the disclosed embodiments are non-limiting. Further, the embodiment shown in FIG. 2 is only one example of a system that may incorporate an embodiment of the present disclosure. In some other embodiments, event-driven orchestration system 200 may have more or fewer components than shown in FIG. 2, may combine two or more components, or may have a different configuration or arrangement of components. For example, although FGC 210 is illustrated as receiving three events from three event sources, this is not intended to be limiting. In alternative embodiments, an FGC 210 may be configured to listen to any number of events received from any number of event sources, map the events from the event sources to event states in the function graph and output the selected events to a serverless function manager 212 to invoke serverless functions associated with the events. Moreover, any number of event state machines and function graphs may be employed, which includes any number of states and actions.

It is also appreciated that event-driven orchestration system 200 can be of various types including a personal computer, a portable device (e.g., a mobile telephone or device), a workstation, a network computer, a mainframe, a kiosk, a server, or any other data processing system or combination thereof. In some other embodiments, event-driven orchestration system 200 may be configured as a distributed system where one or more components of event-driven orchestration system 200 are distributed across one or more networks in the cloud. The one or more of the components depicted in FIG. 2 may be implemented in software, in hardware, or combinations thereof. In some embodiments, the software may be stored in memory (e.g., a non-transitory computer-readable medium), on a memory device, or some other physical memory and may be executed by one or more processing units (e.g., one or more processors, one or more processor cores, one or more GPUs, etc.).

Figure 3A:
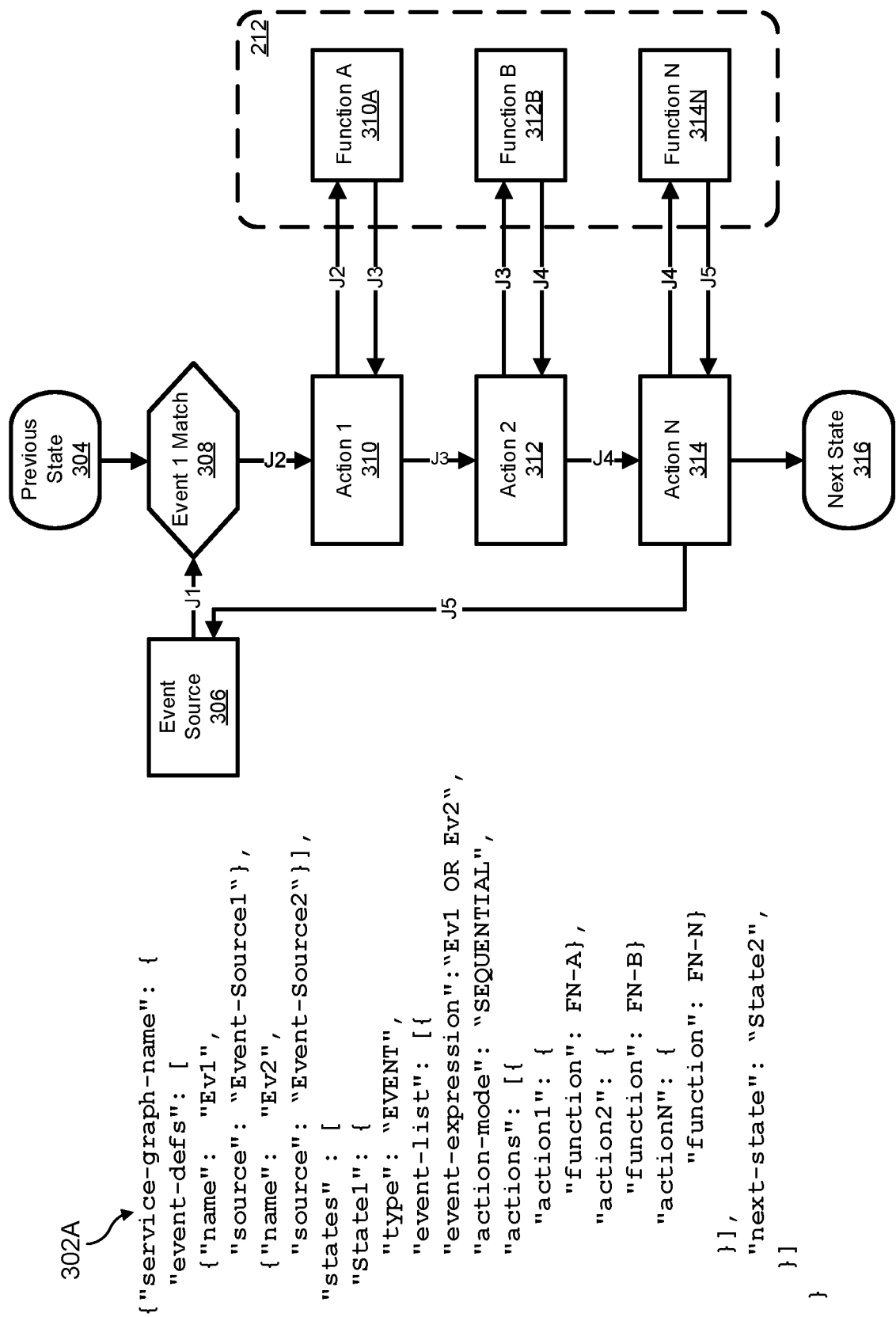
FIGS. 3A-3C illustrate event states with sequential and/or parallel executing actions.
Figure 3B:
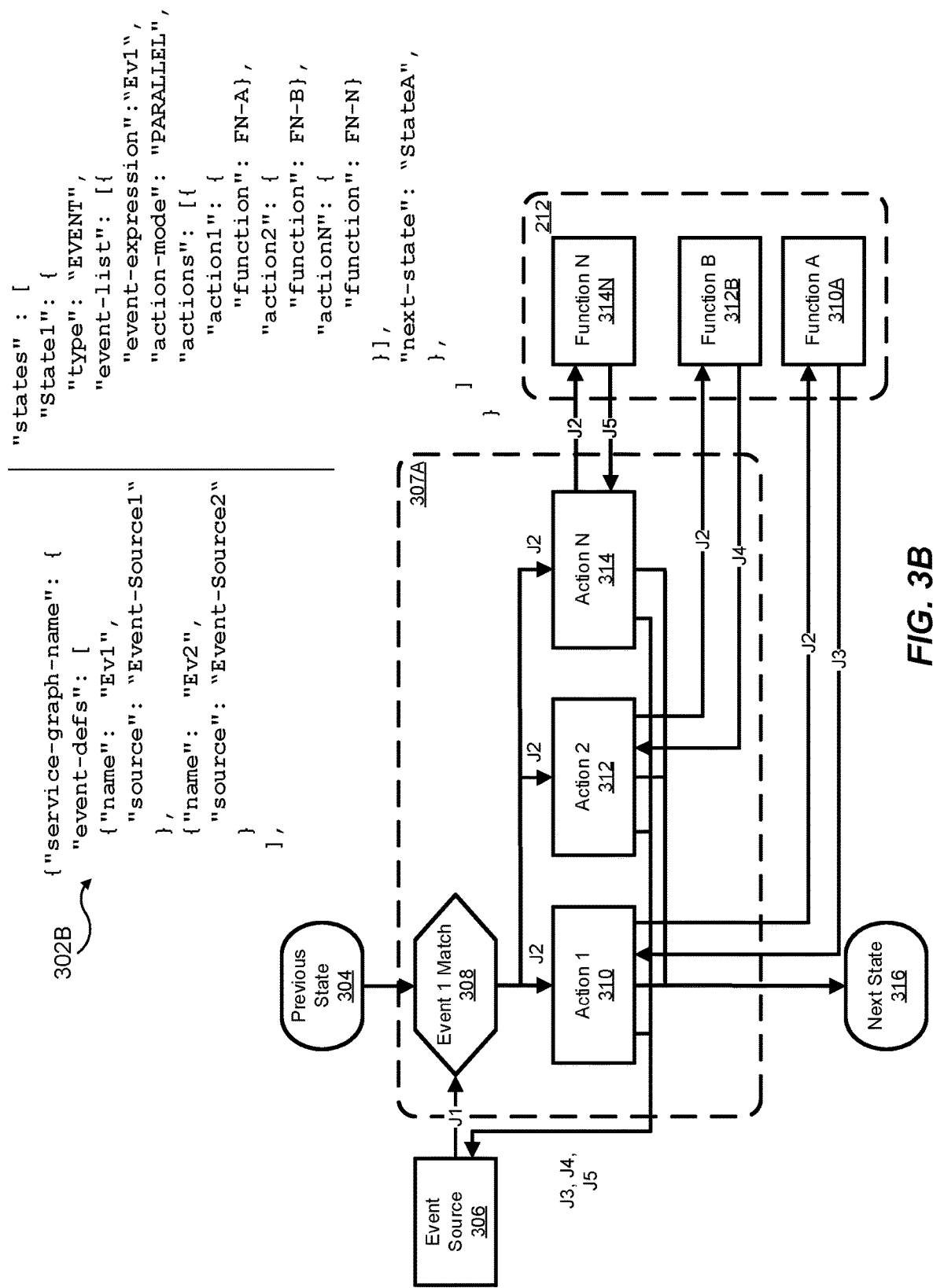
Figure 3C:
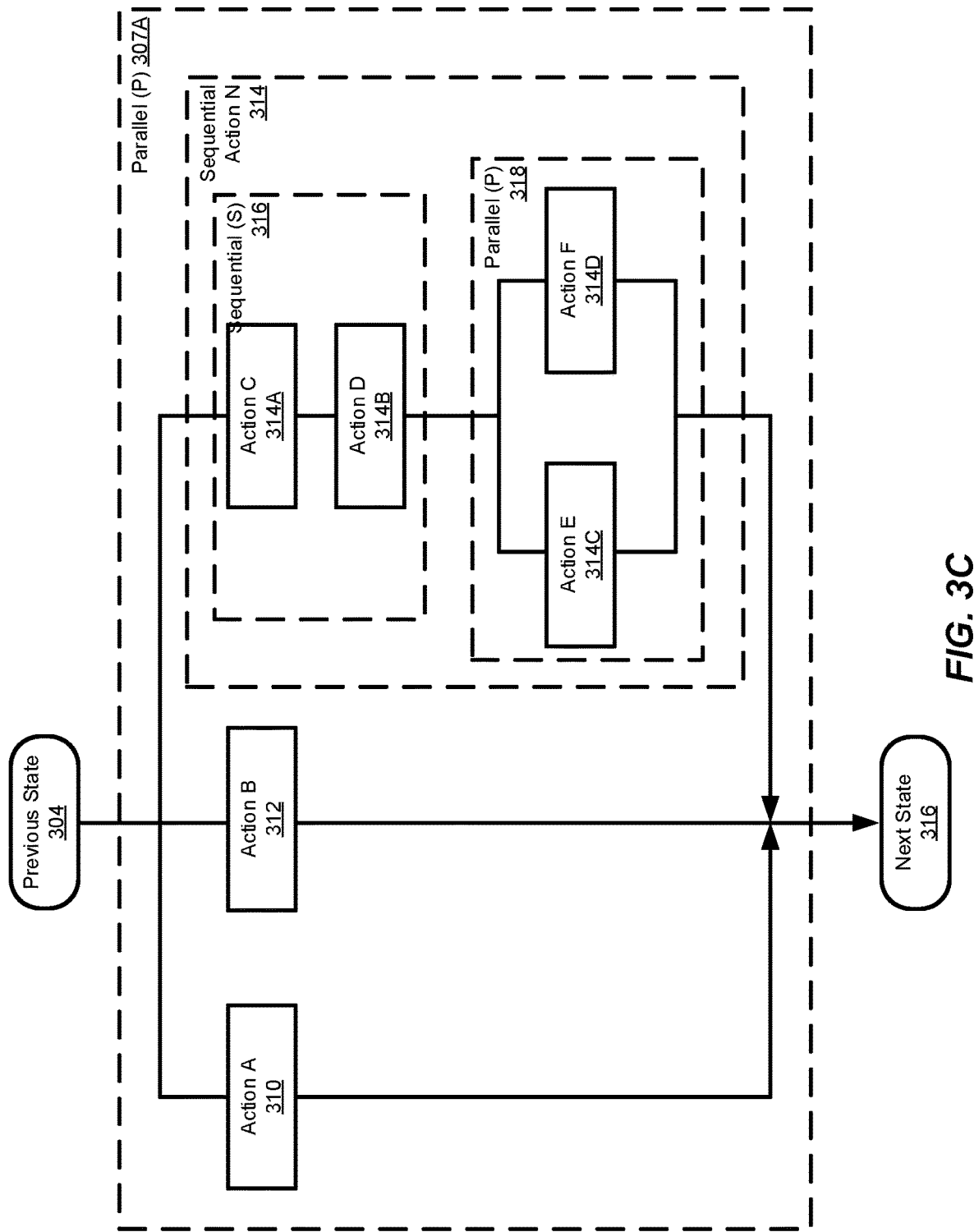

FIGS. 3A-3C illustrate event states with sequential and/or parallel executing actions. In the embodiments described below, the FGC 210 is responsible for receiving events and executing actions that invoke functions on the serverless function manager 212. However, it is appreciated that implementation of the described procedures are not limited to the FGC 210, and that any component or combination of components described in the various figures may be responsible for the operational procedures.

When the FGC 210 has entered the event state 307 from a previous state 304 and events arrive at the FGC 210 from event source 306, actions 310, 312 and 314 in the event state 307 are triggered and executed sequentially (FIG. 3A) or in parallel (FIG. 3B), where actions invoke corresponding serverless functions 312A, 314B and 314N in the serverless function manager 212. In one embodiment, multiple events may be combined using a Boolean expression (e.g., AND, OR logic) for each event state.

With reference to FIG. 3A, and as illustrated in pseudocode 302A, state machines may be defined as a function graph. In the depicted example, the function graph (function-graph-name) has two event definitions: (1) EV1 associated with event source 1 and (2) EV2 associated with event source 2. Recalling from above, each of the listed events may trigger the actions in a particular state. Actions are triggered when an event matches the Boolean expression ("event-expression" in pseudocode 302A) for the event state. Triggered actions will be executed followed by a transition to the next state (e.g., next state 316).

The Boolean expression itself consists of one or more operands (terms) and operators (e.g. AND, OR logic). For example, the Boolean operands are the names of the events that will trigger the state. In the depicted example, two events EV1 and EV2 are combined using a Boolean expression as "EV1 OR EV2" such that the event state 307 queues the events that satisfy the condition until all events have been received, which then causes the state to be triggered. Thus, in the example, when one of event EV1 OR event EV2 arrives, the condition is satisfied. Once satisfied, any actions (e.g., actions 310, 312 and 314) specified to be performed when the event(s) arrives may be executed. Upon completion of the actions having been successfully executed, the state machine 210 (FIG. 2) may transition to the next state 316.

In the depicted example, the actions 310, 312 and 314 are executed sequentially (as defined by the "action-mode" in pseudocode 302A) to invoke a function 310A, 312B and 314N, respectively. An event may also include an event request, which carries the event payload. The payload in the event request of the received event is passed, in sequence, from action 310 to action 314. For example, during previous state 304, event 1 is received at the event state 307. Event 1 has an event request with a payload J1. The event 1 (EV1) satisfies the conditions of the Boolean expression, defined above, and is determined to be a match by FGC 210.

After processing the payload J1 at action 310, the resulting payload J2 is passed as a request to and invokes function 310A. The function 310A executes the request at the serverless function manager 212 and returns a response payload J3 to action 310, which contains a list of action results that handle the result of the action when the response is received. Depending on the results of the response payload J3, various retry handling and next state transitions or termination may be invoked. Otherwise, the response J2 is passed to the next action 312, which sends the payload J3 as a request to and invokes function 312B. The function 312B executes the request at the serverless function manager 212 and returns a response payload J4 to action 312, which handles the response in a manner similar to action 310. Subsequently, the response J4 is passed to the next action 314 which sends the payload J4 as a request to and invokes function 314N. The function 314N executes the request at the serverless function manager 212 and returns a response payload J5 to action 312, which, if satisfying the event request, is passed back to the original event requestor (in this case, the event source 306).

In one embodiment, if the event state 307 receives an event request (e.g., event request J1) having a synchronous invocation, the corresponding action sends the request to the associated function (e.g., function 310A, 312B, 314N) and waits for a response from the serverless function manager 212 of the function before progressing to the next state 316. In another embodiment, if the event state 307 receives an event request J1 having an asynchronous invocation, the action sends the request to the associated function (e.g., 310A, 312B, 314N) and does not expect any response from the serverless function manager 212 of the function. Instead, the action transitions to the next state 316 after the event is sent to the serverless function.

Turning to FIG. 3B, FGC 210 operationally implements the procedures similar to those described above with respect to FIG. 3A, with the following exceptions. In the case of FIG. 3B, the actions 310, 312 and 314 in the event state 307A are executed in parallel (or concurrently), as opposed to being executed sequentially. This is reflected in pseudocode 302B in which the action-mode is listed as "PARALLEL" (as opposed to "SEQUENTIAL" in pseudocode 302A of FIG. 3A). Thus, each action 310, 312, 314 invokes a respective function 310A, 312B and 314N in parallel.

As illustrated, when an event is received from event source 306, the FGC 210 determines at 308 whether the payload matches a Boolean expression ("event-expression"), as defined in the pseudocode 302B. The payload may include, for example, a JSON payload J1. When the received event is determined to match the Boolean expression, the JSON payload J2 is passed to each action 310, 312 and 314 in the event state 307A in parallel (concurrently). Each action 310, 312 and 314 then invokes a respective function 310A, 312B and 314N at the serverless function manager 212. After processing, each function 310A, 312B and 314N concurrently returns a respective event response (e.g. JSON payload J3, J4 and J5) to the each action 310, 312 and 314 having previously invoked the function. The event response is then forwarded as combined event response, including JSON payloads J3, J4 and J5, back to the original event requestor (in this case, event source 306).

Once the parallel actions in event state 307A have been successfully executed, there is a transition to the next state 316. In one embodiment, if any of the parallel actions 310, 312 and 314 fail, FGC 210 performs retry processing. If during the retry processing, a maximum number of retries has been exceeded, there is a transition to the next state 316 as specified in the action result. As noted above, each action result specifies retry handling and next state transitions or termination. Since these retry operations occur in parallel, the transition specified will occur for the action result first exceeding the maximum number of retires. If more than one action 310, 312 and 314 fails, the transition will be to the next state for the action result of the first failed action in the list. For example, if there are three parallel actions 310, 312 and 314, and actions 312 and 314 fail, the transition will be to the action result for action 312.

In FIG. 3C, sequential and parallel actions may be combined to form action sets. A subset of actions may be grouped to be processed in sequence or in parallel. As depicted in the figure, actions 310, 312 and 314 are processed in parallel similar to the embodiment disclosed in FIG. 3B. However, action 314 is defined to include two subsets of actions—a first subset including actions 314A and 314B and a second subset of including actions 314C and 314D. The first and second subsets are nested and executed together as a sequential action 314, where the nested first subset of actions 316 is executed sequentially and the nested second subset of actions 318 is executed in parallel, as described above.

In one embodiment, the combination of actions may be expressed as an execution mode string that groups a subset of actions to be processed in sequence or in parallel. The subsets for sequential and parallel execution may be defined, for example, using the delimiters: S(action A, action B, . . . ) for sequential execution, and P(action D, action E, . . . ) for parallel execution. As explained, the subsets may be nested to define a combination of sequential and parallel executions, where the actions depicted in FIG. 3C may be defined as follows: P(A, B, S(C, D, P(E, F))). The parallel execution P(E, F) is nested within the sequential execution S(C, D, P(E, F)) which is in turn within P(A, B, S(C, D, P(E, F))).

It is appreciated that the embodiment of FIG. 3C is a non-limiting example of a combination of actions processed sequentially and in parallel, and that any number of permutations of actions may be processed.

Figure 4A:
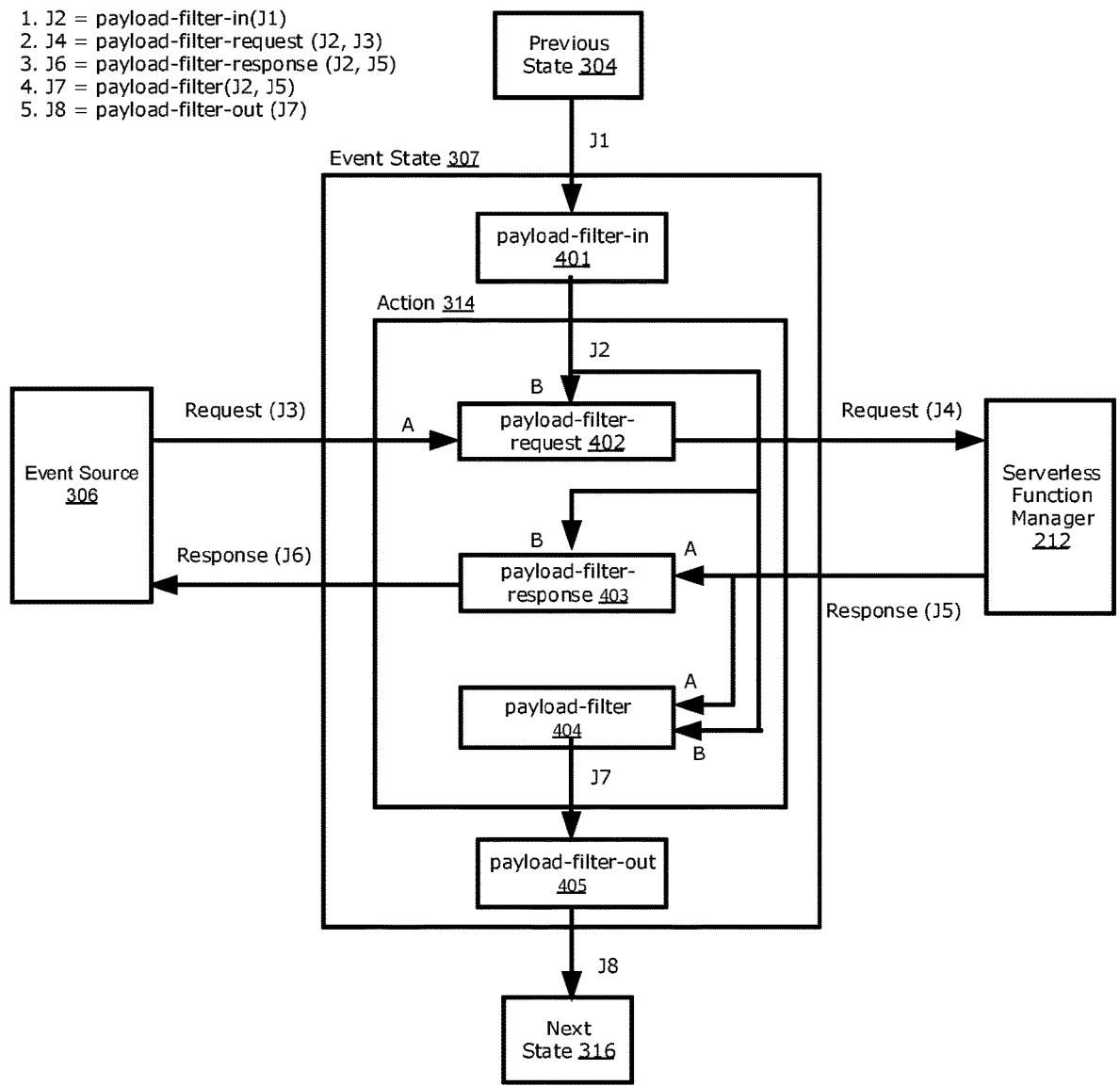
FIGS. 4A and 4B illustrate payload processing and filtering for an event state.
Figure 4B:
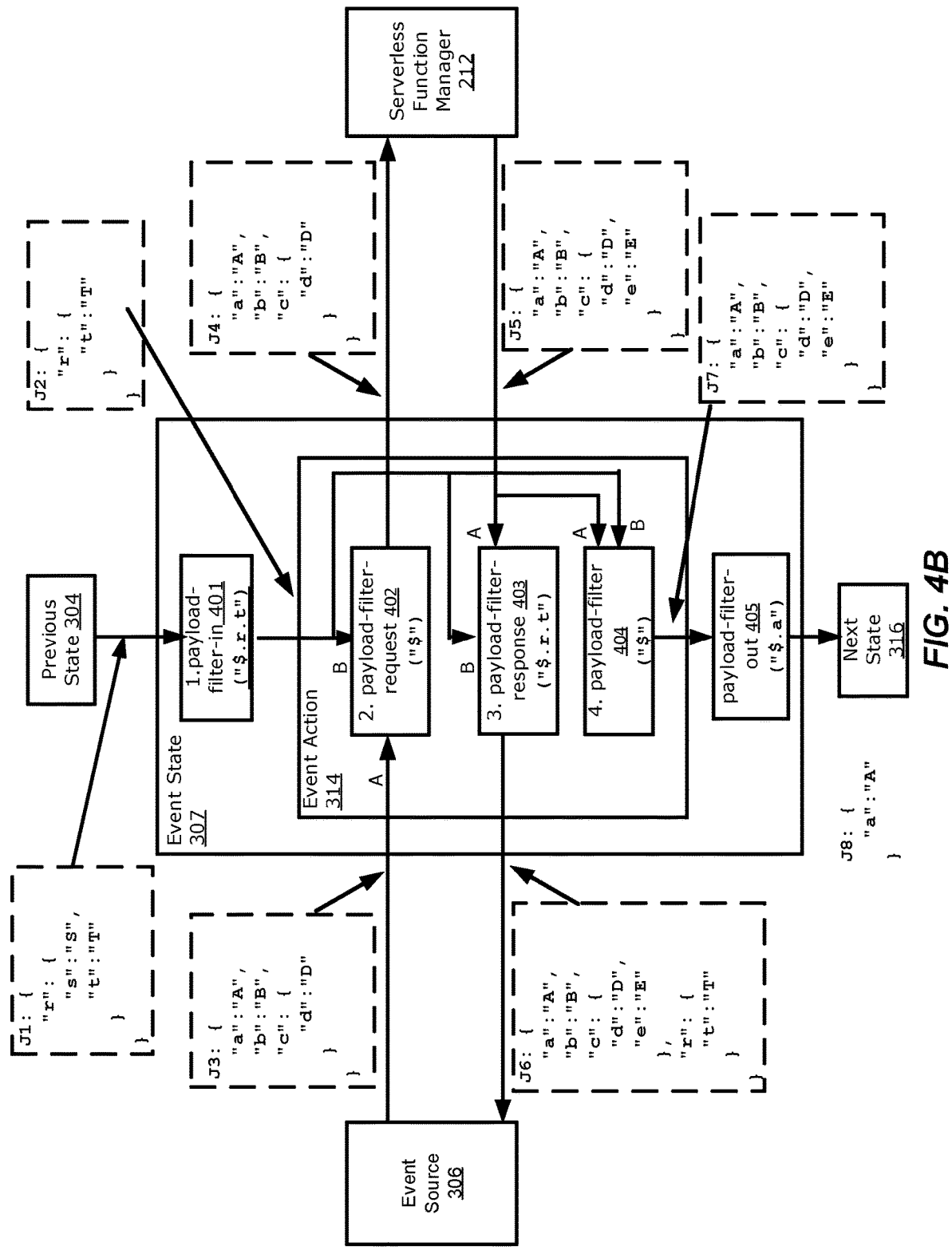

FIGS. 4A and 4B illustrate payload transformation and filtering for an event state. Events received from a corresponding event source 306, as explained above, may be defined in a function graph representing a state machine (for example, state machine 210A or 210B in FIG. 2) and referenced from the "event-expression" (Boolean expression) in the event state 307, such as event state B or C (FIG. 2). Events received from the event sources 306 may include an event request in the form of a payload, such as a JSON payload. Similarly, an event response received from the serverless function manager 212 may include an event response in the form of a payload, such as a JSON payload. For example, in the depicted embodiment, event requests may include JSON payloads J3 and J4 and event responses J5 and J6.

JSON payloads in event requests may be filtered and transformed before being sent to a function in the serverless function manager 212. Likewise, event responses may be filtered before being sent back to the event source 306 that made the original event request.

A payload filter (i.e. "PAYLOAD-FILTER") is a value in a JSON path expression, where the JSON path expression uses the symbol '$' to represent the outer level JSON object and inner elements are accessed using a dot ('.') notation. Nested elements can also be selected using further dots ($.x.y) to select sub-levels of the structure. For example, given the following JSON data:

```
{
  "x": 123,
  "y": ["a", "b", "c"],
  "z": {
    "a": true,
    "b": 4
  }
},
```

The following table shows the values obtained by applying various JSON path expressions to the data:

| Path | Value |
| --- | --- |
| $.x | 123 |
| $.y | ["a", "b", "c"] |
| $.z.a | true |
| $.y[1] | "b" |

As will become apparent from the below examples in FIGS. 4A and 4B, the "payload-filter" selects the portion of a first JSON payload (e.g., from a first event source) to be overwritten by, or added to, a second JSON payload (e.g. from a second event source). If the "payload-filter" is not specified, the filter defaults to $' which represents the entire JSON payload. If the "payload-filter" is "null", the input is discarded so the JSON input represents an empty object "{ }".

An example JSON function graph definition with an event definition is:

```
{"function-graph-name": {
  "event-defs": [
    {
      "name": EVENT-NAME,
      "source": SOURCE-ID,
```

-continued

```
        "payload-filter-request": PAYLOAD-FILTER,
        "payload-filter-response": PAYLOAD-FILTER
      }
    ]
  }}
```

In this context, the "name" is used by the "event-expression" in the event state, the "source" specifies the event source, the "payload-filter-request" specifies a filter for the JSON event request payload from the event source, and the "payload-filter-response" specifies a filter for the JSON event response payload before it is sent back to the event source.

As explained above, the event state 307 allows for handling of events from event sources 306, where the event state specifies a list of "event-expression" structures that are used to match incoming events. The first event to match an "event-expression" for the incoming state will cause actions for this "event-expression" to be executed followed by a transition to the next state. In one embodiment, the Boolean expression may handle multiple events. For example, a Boolean expression for multiple events may be defined as: "event-expression": (event A or event B) AND event C. A non-limiting example JSON function graph definition including the action-mode and actions to be taken upon arrival of a matching event state is:

```
{
    "name": "STATE-NAME",
    "type": "EVENT",
    "event-timeout": TIMEOUT,
    "events": [
      {
        "event-expression": EVENTS-EXPRESSION,
        "action-mode": ACTION-MODE,
        "actions": [
          ACTION-DEFINITION,
        ],
        "next-state": STATE-NAME
      }
    ]
}
```

The "event-timeout" field optionally specifies the maximum amount of time to wait for the events specified in the "event-expression." For example, if specified, an event timer starts may begin counting from zero when the event state is entered and is reset to zero when any event defined in the "event-expression" is received. If the event timer expires, there is a transition to the next-state. Otherwise, the event timer is stopped when an "event-expression" is triggered.

The events field lists events that may trigger actions in the specified event state. The first event to match an "event-expression" for the event state will cause actions for the "event-expression" to be executed followed by a transition to the next state 316.

The "event-expression" field, as explained, is a Boolean expression which consists of one or more operands (terms) and the Boolean operators: AND, OR. The Boolean operands are the names of events that will trigger the event state. For example: EVENT-EXPRESSION="event55" or EVENT_EXPRESSION="(event A or event B) and event 33". In the case of an AND operation between two or more events, the event state will queue the events that satisfy the condition until all of the events have been received, followed by a triggering of the event state. For example, in the expression above, if the event state receives "event 33", the event will be queued at the event state until the arrival of "event A" or "event B".

The field "action-mode": ACTION-MODE optionally specifies a sequential or a parallel actions, or both. The actions are executed in sequence when designated as "SEQUENTIAL" and concurrently when designated as "PARALLEL".

The actions field is a list of action definition constructs (ACTION-DEFINITION) that specify the actions to be performed when an incoming event matches the "event-expression".

The "next-state": STATE-NAME field specifies the name of the next state to transition to after all the actions for the matching event have been successfully executed.

Processing of the JSON payloads with events, for example as defined above, is now described with reference to FIG. 4A. In the disclosed embodiment, the events are processed in sequence by the FGC 210, although it is appreciated that any number of components may be responsible for such implementation and that the FGC 210 is merely one non-limiting example. It is also appreciated that the events may be processing concurrently or a combination of in sequence and/or concurrently, as described above.

The function graph representing the state machine receives an event payload (JSON payload) with the event request received from event source 306. The event payload is delivered to a serverless function manager 212 which invokes a corresponding function. In the disclosed embodiments, "A" refers to an event payload received from event source A, whereas "B" refers to a payload received from a previous state. The flow in FIGS. 4A and 4B of the JSON-encoded event payload is as follows.

1. The JSON payloads are processed through each event state 307 as follows. The input from the previous state 304 in sent to the payload filter "payload-filter-in" 401, which manipulates the payload J1 from the previous state. Processing of the payload J1 from the previous state 304 using the "payload-filter-in" 401 results in JSON payload J2.
2. As events are sent by event source 306, event requests sent with the events are input in the "payload-filter-request" 402. In the example, the event request is in the form of a JSON payload J3. Based on the filtering criteria, the "payload-filter-request" 402 modifies (e.g., adds) portions of the JSON payload J2 (from the previous state) to the JSON payload J3 (event request) before being sent in the event request J4 to the serverless function manager 212 for processing by a specified function. Accordingly, JSON payload J4 includes at least portions of JSON payloads J2 and J3.
3. Once the JSON payload J4 has been processed by a function at the serverless function manager 212, an event response is sent back to the events state 307 for further processing. For example, the serverless function manager 212 returns a JSON payload J5 after completion of processing the received payloads. At 403, the event response payload filter "payload-filter-response" modifies (e.g., adds) portions of the JSON payload J2 (from the previous state) to the JSON payload J5 (event response) before being sent in the event response J6 back to the event source 306 issuing the original event request.
4. Once the event response (JSON Payload J5) is received, the "payload-filter" 404 modifies (e.g., adds) portions of the JSON payload J2 received from the previous state to the JSON payload J5 in the event response from the serverless function manager 212 to produce JSON payload J7.

5. At 405, the "payload-filter-out" manipulates the JSON payload J7 before being output as JSON payload J8 to the next state.

In one example applied to the processing and filtering diagram of FIG. 4A, the event request payload filter "payload-filter-request" 402 selects a portion of the received JSON payload J2 to be overwritten by, or added to, the event request JSON payload J3 before being sent in the JSON payload J4 to the serverless function manager 212. For example, (a) if "payload-filter-request" 402 has a default value of $, the entire JSON payload J3 is passed to the serverless function manager 212 as JSON payload J4, and JSON payload J2 is not used; (b) if "payload-filter-request" 402 is null, the received JSON payload J2 is passed to the serverless function manager 212 as JSON payload J4, and JSON payload J3 is discarded; (c) if "payload-filter-request" 402 matches an item in the JSON payload J2 and matches an item in the JSON payload J3, the value of the item in JSON payload J3 is overwritten by the value of the item from the received JSON payload J2, and the modified JSON payload J4 is passed to the cloud provider 212; and (d) if "payload-filter-request" 402 matches the item in the JSON payload J2, but does not match an item in the JSON payload J3, then the received JSON payload J2 is added to the JSON payload J3, and the expanded JSON payload J4 is passed to the serverless function manager 212.

Similar processing applies to "payload-filter-response" 403 and "payload-filter" 404. For example, if payload-filter-request is "$.b" and the JSON navload (J3) is:

```
{
  "a":"A",
  "b":"B"
}
```

And JSON payload J2 is {"b":"B2" }, then the value "B" of matching item "b" in JSON payload J3 is overwritten by the value "B2" from JSON payload J2 and the modified JSON payload J4 that is passed to the serverless function manager 212 will be:

```
{
  "a":"A",
  "b":"B2"
}
```

If "payload-filter-request" is "$.c", and matches the JSON payload J2 {"c":"C"}, the expanded JSON payload J4 that is passed to the Cloud function will be:

```
{
  "a":"A",
  "b":"B",
  "c":"C"
}
```

Turning to FIG. 4B, a specific example of event filtering is disclosed. In the depicted example, the various payload filters may be used to merge JSON content from two event sources (A and B) and/or to modify JSON content. For example, in one embodiment, JSON content may be merged from multiple event sources such as: (1) "payload-filer-request" 402 merges JSON payload J2 and JSON payload J3 to form JSON payload J4; (2) "payload-filter-response" 403 merges JSON payload J2 and JSON payload J5 to form JSON payload J6; and action "payload-filter" 404 merges JSON payload J2 and JSON payload J5 to form JSON payload J7.

In another embodiment, content in the JSON payload may be modified. For example, "payload-filter-in" 401 may modify JSON payload J1 to form JSON payload J2 and "payload-filter-out" 405 may modify JSON payload J7 to form JSON payload J8.

It is appreciated that the examples above are non-limiting and that any number of examples of merging and modifying the JSON payloads may be implemented.

FIGS. 5A-5C illustrate flow diagrams in accordance with the disclosed embodiments. The procedures described in the diagram are implemented by the function graph controller for purposes of discussion. However, it is appreciated that any system component or combination of components may implement the procedures.

With reference to FIG. 5A, the FGC 210 receives events from different external sources in one embodiment at 502. The events may include an event request, such as a payload. The events are mapped to corresponding event states of a function graph according to mapping rules at 503. These event states may include one or more actions. The actions are executed, at 504, in response to the received events satisfying conditions of the mapping rules. For example, a condition may be satisfied when two events are received or when either one or the other event is received. In either case, execution of the actions causes a corresponding serverless function at a serverless function manager to be invoked to process the event request. At 505, an event response is received in reply to the received one or more events, the event response based on execution of one or more tasks corresponding to a sequence of the executed one or more actions.

In another embodiment, and with reference to FIG. 5B, the FGC 210 sequentially or concurrently executes the actions by the event states at 506. Here, each of the actions invokes a corresponding serverless function such that a payload included in the event request is passed to the corresponding serverless function for execution.

In one other embodiment, with reference to FIG. 5C, the FGC 210 filters contents of the payload to modify the payload based on filtering and transformation criteria, at 508, and combines multiple event responses matching the completed concurrent action of an event state into a payload or metadata of a single event response, at 509.

Figure 5D:
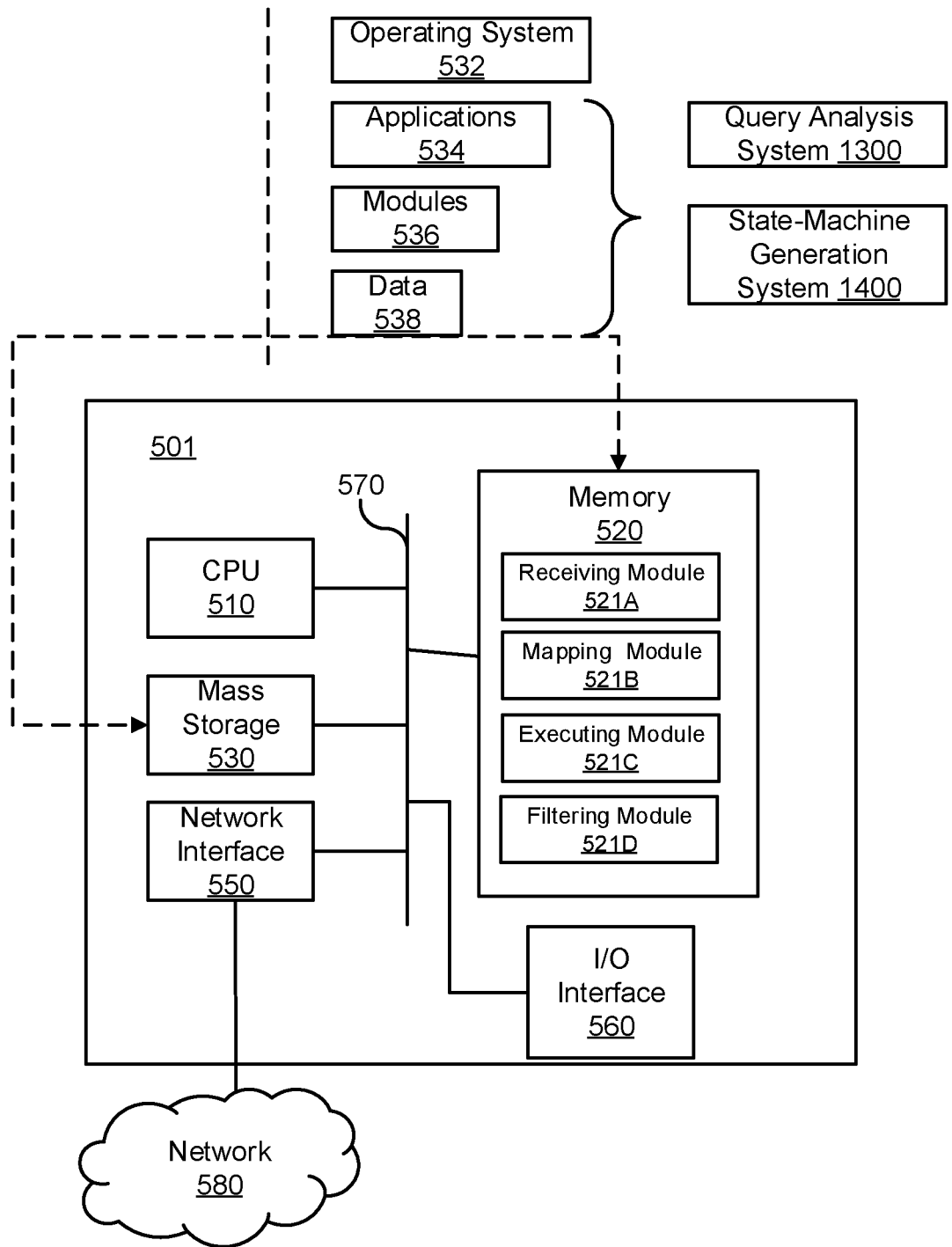
FIG. 5D illustrates a block diagram of a network system that can be used to implement various embodiments.

FIG. 5D is a block diagram of a network device that can be used to implement various embodiments. Specific network devices may utilize all of the components shown, or only a subset of the components, and levels of integration may vary from device to device. Furthermore, the network device may contain multiple instances of a component, such as multiple processing units, processors, memories, transmitters, receivers, etc. The network device may comprise a processing unit 501 equipped with one or more input/output devices, such as network interfaces, storage interfaces, and the like. The processing unit 501 may include a central processing unit (CPU) 510, a memory 520, a mass storage device 530, and an I/O interface 560 connected to a bus 570. The bus 570 may be one or more of any type of several bus architectures including a memory bus or memory controller, a peripheral bus or the like.

The CPU 510 may comprise any type of electronic data processor. The memory 520 may comprise any type of system memory such as static random access memory (SRAM), dynamic random access memory (DRAM), synchronous DRAM (SDRAM), read-only memory (ROM), a combination thereof, or the like. In an embodiment, the memory 520 may include ROM for use at boot-up, and DRAM for program and data storage for use while executing programs. In embodiments, the memory 520 is non-transitory. In one embodiment, the memory 520 includes a receiving module 521A receiving one or more events from one or more external sources (such as an HTTP gateway, storage, messaging or queuing services), the one or more events including an event request, a mapping module 521B mapping the one or more events to one or more event states of a function graph according to mapping rules, an executing module 521C one or more actions by the one or more event states in response to the one or more event states being triggered by the mapped one or more events, wherein execution of the one or more actions causes a corresponding one or more serverless functions to be invoked and a filtering module 521D filtering contents of the payload to modify the payload based on filtering criteria.

The mass storage device 530 may comprise any type of storage device configured to store data, programs, and other information and to make the data, programs, and other information accessible via the bus 570. The mass storage device 1230 may comprise, for example, one or more of a solid state drive, hard disk drive, a magnetic disk drive, an optical disk drive, or the like.

Memory 520 and mass storage device 530 can include, or have stored therein, operating system 532, one or more applications 534, one or more program modules 536 and data 538. The operating system 532 acts to control and allocate resources of the processing unit 501. Applications 534 include one or both of system and application software and can exploit management of resources by the operating system 532 through program modules 536 and data 538 stored in memory 520 and/or mass storage device 530 to perform one or more actions. Accordingly, applications 534 can turn a general-purpose computer into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, a query analysis system 1300 and a state-machine generation system 1400 can be or form part of part of the application 534, include one or more modules 536 and data 538 stored in memory and/or mass storage 530 whose functionality can be realized when executed by one or more processor(s)/CPU(s) 510.

The query analysis system 1300 includes a validation component (not shown) that is configured to receive, retrieve, or otherwise obtain or acquire a query. For example, the query can correspond to a language-integrated query, amongst other types of queries. The validation component checks or validates the query as a function of a state machine component (also referred to as a state machine, such as state machines 210A and 210B in FIG. 2), which captures constraints of a target query language including but not limited to supported query operators and patterns of query operators (e.g., limits on the number of occurrences of query operators and relative ordering of query operators), for example. In one embodiment, the state machine component can be a type-based state machine that captures constraints as types and methods as discussed below. If the query does not meet the constraints of a target query language, for example, if an invalid query operator or invalid pattern of query operators is detected, the validation component can signal an error. In one other embodiment, the validation component can perform compile-time checking of the query thus mitigating the risk of runtime failure. Accordingly, the validation component can form part of a program language compiler.

The state-machine generation system 1400 includes an analysis component and a generation component (not shown). The analysis component can analyze target query-language semantics including grammar and type system to determine constraints or restrictions on the target query language, where the grammar describes acceptable syntax and the type system describes proper usage of data types. Based on the analysis, the generation component can produce a state machine (e.g., state machine component), such as the state machines 210A and 210B depicted in FIG. 2, that captures constraints on the target query language. In one embodiment, the state machine can be type-based or the generation component can produce a state machine of types. In this case, states can be encoded as types and transitions between states can be encoded as methods. The generation component can also receive one or more parameters indicating a desired size and/or complexity of a generated state machine. As a result, the state machine can include all constraints specified by the grammar and type system, a subset of the constraints, or even a superset of the constraints.

The processing unit 501 also includes one or more network interfaces 550, which may comprise wired links, such as an Ethernet cable or the like, and/or wireless links to access nodes or one or more networks 580. The network interface 550 allows the processing unit 501 to communicate with remote units via the networks 580. For example, the network interface 550 may provide wireless communication via one or more transmitters/transmit antennas and one or more receivers/receive antennas. In an embodiment, the processing unit 501 is coupled to a local-area network or a wide-area network for data processing and communications with remote devices, such as other processing units, the Internet, remote storage facilities, or the like.

Function graphs, which are driven by events from a wide variety of event sources, control the execution of serverless functions in a prescribed manner. For example, function graphs permit the user to arrange serverless functions to be executed in sequence or concurrently or both, manage error conditions with retries, and handle scaling to accommodate varying event load. In one embodiment, as shown in FIG. 2, the FGC 210 allows for the instantiation and dispatch of multiple function graphs as needed. Function graphs allow the user to define one or more rendezvous points (e.g., event states). The user may define definition of a rendezvous point, where the definition of the rendezvous point may include one or more events for triggering an action of the rendezvous point. The rendezvous point waits for the one or more predefined events before executing the action. Similarly with the rendezvous point, the user may define definitions of other types of states of a function graph, and the other types of states will execute corresponding actions based on the definition and trigger serverless functions associated with the executed actions. Therefore, the function graph provides a consistent framework for managing serverless functions to the user. The user, who merely defines the logic of the function graph, needs neither deploy serverless functions on their own, nor deploy and manage physical servers on which the serverless functions execute.

Figure 6:
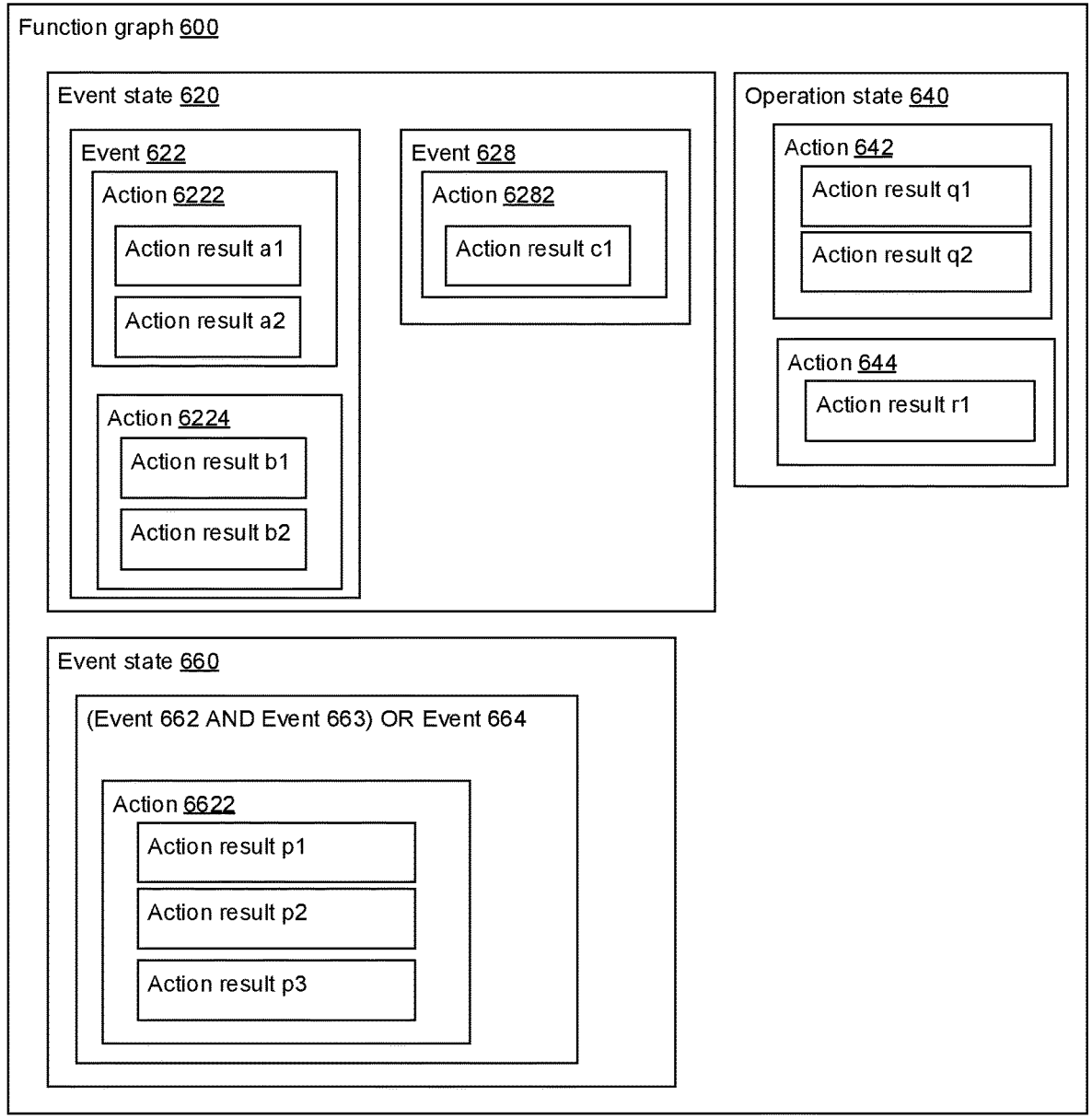
FIG. 6 illustrates an example for a function graph.

FIG. 6 illustrates an example for a function graph which includes a state, an event, an action, and an action result. There are various types of states which have been discussed above, each state associated with different actions and different contents. As illustrated in FIG. 6, each event state may have different definitions and include one or more events. Each event may correspond to a list of actions. After receiving one or more predefined events, the event state will execute a list of actions associated with the received events in sequence or in parallel or both. Each action may have a list of action results. Each action result may specify retry handling and next state transitions or service graph termination.

In the example shown in FIG. 6, function graph 600 includes event state 620, event state 660 and operation state 640. The definition of event state 620 includes two events: event 622 and event 628, the definition of event state 660 includes event 6622. As shown in FIG. 6, when event 622 is received by event state 620, action 6222 and action 6224 will be executed. When event 628 is received by event state 620, action 6282 will be executed. In this example, the execution of action 6222 may generate two results: a1 and a2 (based on different responses from the serverless functions); the execution of action 6224 may generate two results: b1 and b2; the execution of action 6282 may generate one result c1. In one example, event state 660 may receive three events: event 662, event 663, and event 664. Based on the evaluation of the Boolean expression (Event 662 AND Event 663) OR Event 664, action 6622 may be executed, which generates three results: p1, p2, and p3. Operation state 640, which cannot receive any events from external event sources, has actions 642 and 644. Action 642 may generate two results: q1 and q2, and action 644 may generate one result r1.

An example of JSON function graph definition with an event state is shown below:

```
{
  "event-defs": {
    EVEMT NAME : {
      "source": SOURCE-ID,
      "payload-filter-request": PAYLOAD-FILTER,
      "payload-filter-response": PAYLOAD-FILTER
    }
  },
  "states": {
    STATE NAME: {
      "type": EVENT,
      "payload-filter-in": PAYLOAD-FILTER,
      "payload-filter-out": PAYLOAD-FILTER,
      "events": [
        {
          "event-expression": EVENTS-EXPRESSION,
          "action-mode": ACTION-MODE,
          "actions": [
            {
              "name": ACTION-NAME,
              "function": FUNCTION-ID,
              "timeout": TIMEOUT-VALUE,
              "payload-filter": PAYLOAD-FILTER,
              "results": [
                {
                  "match": RESULT-VALUE,
                  "retry-interval": INTERVAL-VALUE,
                  "max-retry": MAX-RETRY,
                  "next-state": STATE-NAME,
                }
              ],
            }
          ],
        }
      ],
            "next-state": "STATE-NAME"
    }
  }
}
```

In one example, the definition of an action may be shown below:

```
{
  "action-name": ACTION-NAME,
  "function": FUNCTION-ID,
  "timeout": TIMEOUT-VALUE,
  "payload-filter": PAYLOAD-FILTER,
  "results": [
    ACTION-RESULT-DEFINITION
  ],
}
```

The "action-name" field identifies the name of an action.

FUNCTION-ID in the "function" field specifies the serverless function which is associated with the action and should be invoked based on the execution of the action. FUNCTION-ID should be a valid universal unique identifier (UUID) that references a serverless function.

In one embodiment, if an event state receives an event having a synchronous invocation, an action associated with the received event sends payload or metadata of the event to a corresponding serverless function and then waits for a response from the corresponding serverless function before progressing to a next state. In another embodiment, if the event state receives an event having an asynchronous invocation, the action associated with the received event sends payload or metadata of the event to the corresponding serverless function and does not expect any response from the corresponding serverless function, and the action transitions immediately to the next state after payload or metadata of the event is sent to the corresponding serverless function.

In one embodiment, referring to FIG. 4A and FIG. 4B, a corresponding action may interact with the payload carried in the event and send processed payload to the corresponding serverless function. Similarly with the payload in the event, the metadata of the event may be processed in a similar way as shown in the FIG. 4A and FIG. 4B. The metadata of the event relates to event information which includes an event ID, a sourcing address, a type, and so on. Before sending the payload and/or metadata carried in JSON of any request or response in the FIGS. 4A and 4B, the payload and/or metadata maybe filtered.

The "timeout" field may be a non-zero value that specifies the maximum amount of time in seconds waiting for the completion of the serverless function's execution. The "timeout" field is used for a synchronous invocation of the serverless function where the action waits for a response of the execution of the serverless function. TIMEOUT-VALUE must be a positive integer. A timer may be started when the request is sent to the serverless function. If the timer expires, an error code will be returned to the action and this error code may be used to match an action result.

The "payload-filter" field specifies how the JSON response payload from the serverless function is to be filtered before the processing comes to the next action or the transition to the next state. PAYLOAD-FILTER may be a valid JSON Path. The payload-filter may be applied on a successful response from the serverless function.

The "results" field includes a list of action results (ACTION-RESULT-DEFINITION) that specify how a response received from the serverless function is to be handled.

In one example, the action result is one of the following operations:
 Match on the response value received from the serverless function;
 Retry interval;
 Maximum number of retries;
 Next state if the maximum retry is exceeded.

An example of the action result defined in JSON is shown as below:

```
{
    "match": RESULT-VALUE,
    "retry-interval": INTERVAL-VALUE,
    "max-retry": MAX-RETRY,
    "next-state": STATE-NAME
}
```

The "match" field specifies a matching value for the result. If the result received from a serverless function matches the RESULT-VALUE in the "match" field, then the other fields in the action result will be processed. A timeout is represented by a RESULT-VALUE of SYS.Timeout.

The "retry-interval" field and "max-retry" field maybe optional and may be used in case of an error result. If the "retry-interval" field is not present, there maybe no retry attempt. The "retry-interval" field describes an interval between the time that the error response is received and the time the retry is sent. The "max-retry" field is the maximum number of retry attempts. These fields should be positive integers.

The "next-state" field maybe a required field that specifies the name of the next state. STATE-NAME may be a valid state name within the function graph. The STATE-NAME cannot be the current state.

The "results" filed may specify how an error response received from a serverless function is to be handled. Except for the error strings returned directly from the serverless functions, there may be other error strings. The following table shows an example of a set of error name strings of an execution result of the action.

| Error Name | Description |
| --- | --- |
| SYS.MatchAny | This is a wild card to match any Error Name. |
| SYS.Timeout | This occurs when the Action timeout expires if a serverless function fails to respond to a request. |
| SYS.Fail | This occurs when the Action cannot invoke a serverless function. |

Figure 7:
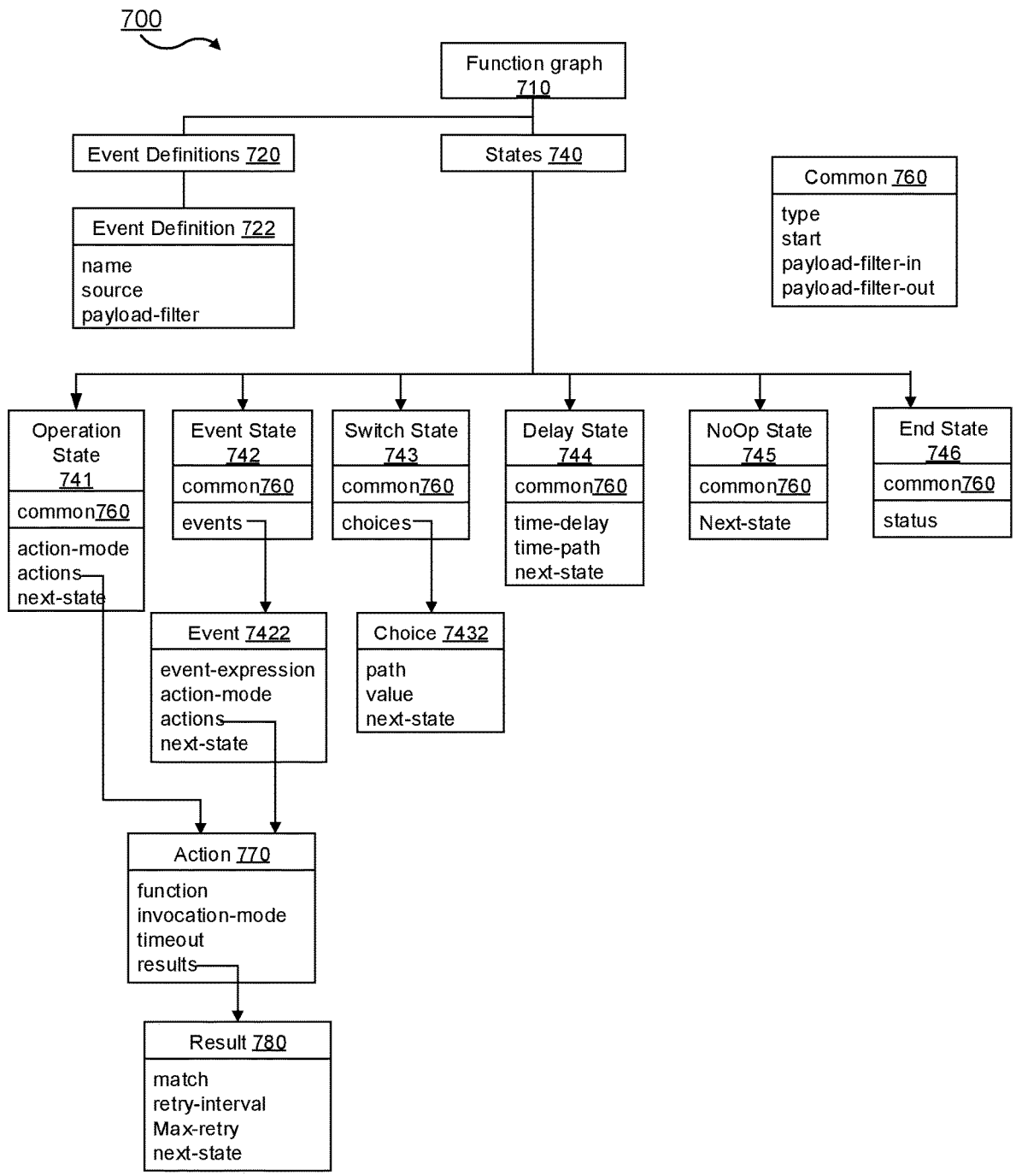
FIG. 7 illustrates an example of syntax summary of function graph.

The FIG. 7 illustrates an example of syntax summary 700 for function graph 710. The function graph 710 includes a plurality of states 740 including operation state 741, event state 742, switch state 743, delay state 744, NoOp state 745 and end state 746. Each state includes a plurality of fields as shown in FIG. 7, such as "common" field 760, "action" field 770, "result" filed 780, etc. In one embodiment, "common" field 760 includes the following parameters: type, start, payload-filter-in, and payload-filter-out. Event definitions 720 describes one or more triggering events. In one embodiment, event definition 722 may include the following parameters: name, source, and payload filter. FIG. 7 shows an example of syntax summary of function graph 710 and contents of different types of states, and does not limits the scope of the syntax. In some scenarios, syntax of function graph 710 may include more fields or parts of fields other than those listed in the FIG. 7.

The event resource, which sends one or more events to an event state of a function graph, maybe an activity which is a long-lived task hosted on an external server. The activity has a worker which processes the accesses of the function graph by sending work requests to a corresponding function graph. The function graph receives work requests from the worker and dispatches working items to the worker. The function graph invokes cloud functions to manage the work items for the worker. The worker maybe an application running on the external server and deals working items received from function graph.

Figure 8:
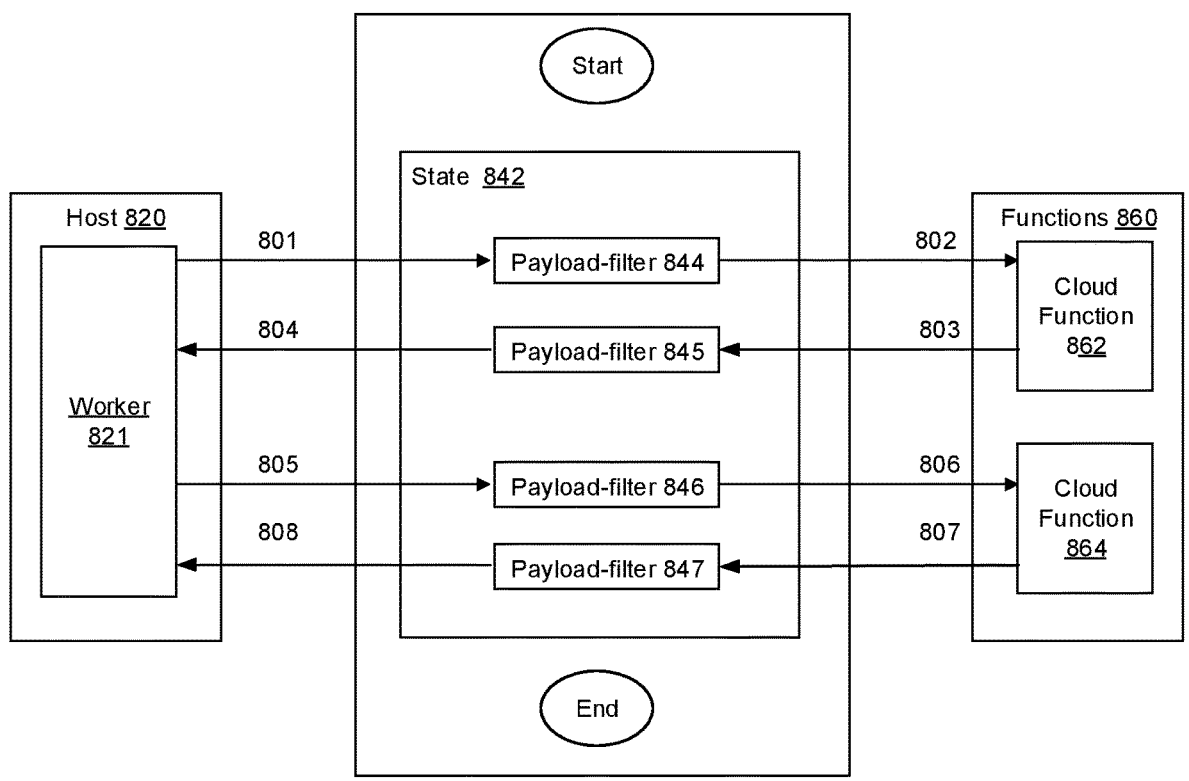
FIG. 8 illustrates an example of a long-lived activity processing flowchart.

FIG. 8 illustrates an example of a long-lived activity processing diagram for a. Function graph 840 that coordinates the operation of the activity worker as follows:

At operation 801, worker 821 on host 820 sends a work request to function graph 840. An example of "worker-Name" field is included in the work request:

```
{
    "type": "WorkRequest",
    "workerName": "worker-name-string"
}
```

At operation 802, if function graph 840 maps the work request to event state 842 based on the "workerName" field, event state 842 of function graph 840 then invokes cloud function 862 in function 860 to process the work item for the worker.

At operation 803, cloud function 862 sends a response with the work item encoded in JSON "workItem" field to function graph 840.

At operation 804, function graph 840 may generate a unique taskToken which is assigned to the worker process and included in the response sent by cloud function 862. The function graph 840 sends the response to worker 821. Worker 821 includes the taskToken in all further requests to be sent to function graph 840. An example of JSON syntax of the response in step 804 is:

```
{
"taskToken": "token-string",
"workItem": "work-item-string"
}
```

If there is no work for worker 821, the response will include a null taskToken and a null workItem for the "taskToken" and "workItem" fields, respectively.

Worker 821 executes the work item in the response.

If the task performed by the worker is long-lived, worker 821 may send a periodic heartbeat to function graph 840 as a alive indication. Worker 821 may include the taskToken in the heartbeat request for identifying the worker process. An example of JSON syntax of the Heartbeat request is:

```
{
    "type": "Heartbeat",
    "taskToken": "token-string"
}
```

At operation 805, worker 821 sends a work success request to function graph 840 with the JSON results including "workResult" field after the work item is completed. The worker 821 may send the work success request repeatedly to report intermediate results. The worker 821 may include the taskToken in the work success request to identify the worker process. An example of JSON syntax of the work success request is:

```
{
    "type": "WorkSuccess",
    "taskToken": "token-string",
    "workResult": "work-result-string"
}
```

At operation 806, function graph 840 sends the work success request to cloud function 864 for processing the work results carried in the work success request.

At operation 807, cloud function 864 processes the work results and sends a response to function graph 840.

At operation 808, function graph 840 sends the response received from cloud function 864 to the worker 821.

Requests or responses from/to function graph 840 may be processed by a corresponding payload filter (844, 845, 846, and 847).

State 842 of function graph 840 may include payload filters for filtering payload and/or metadata of requests and responses.

In one embodiment, if worker 821 does not process the work item successfully, worker 821 may send a work failure request to function graph 840 to report an error. An example of JSON syntax of the work failure request is:

```
{
    "type": "WorkFailure",
    "taskToken": "token-string",
    "error": "error-string"
}
```

Figure 9:
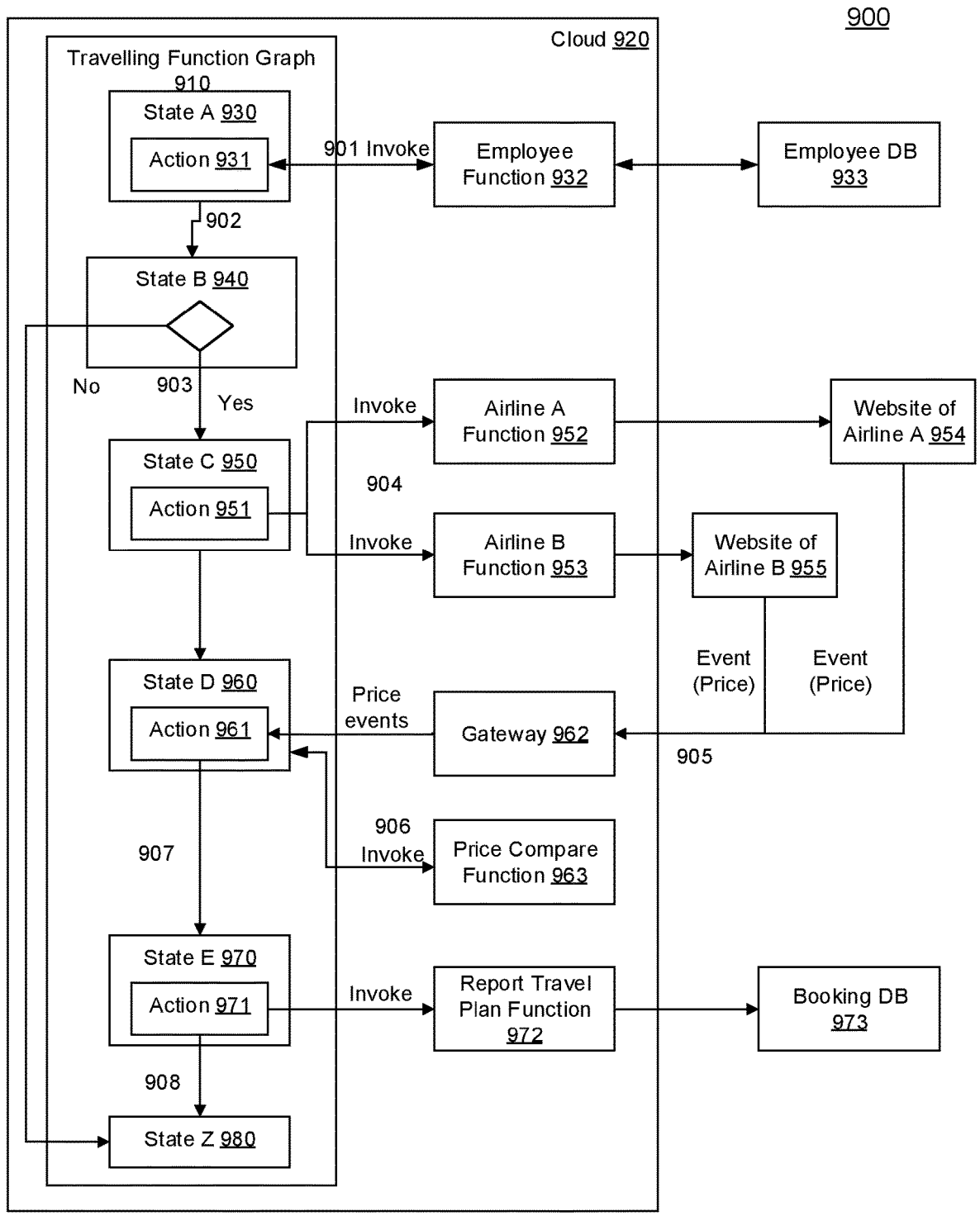
FIG. 9 illustrates an embodiment of coordinating serverless functions for managing employee travelling.

FIG. 9 illustrates a method 900 of coordinating serverless functions for managing employee travelling. As an example, cloud 920 includes travelling function graph 910 and a plurality of serverless functions, where travelling function graph 910 is used for managing the process for booking travelling flights.

Travelling function graph 910 may be invoked by a client (not shown in the FIG. 9). For example, the client sends a travelling event to a function graph controller (FGC), such as FGC 210 as shown in FIG. 2. The FGC determines that the travelling event corresponds to a travelling function graph 910 based on a predefined mapping rule. Then state A 930 of travelling function graph 910 is triggered. For example, the FGC records a plurality of function graphs including travelling function graph 910, medical insurance function graph and so on. When the FGC receives an event, it may determine that the event maps to an event state of the travelling function graph 910 based on the mapping rule. The mapping rule may relate to a relationship between the event state of travelling function graph 910 and a corresponding event source. Furthermore, the mapping rule may further include a mapping between one or more actions of travelling function graph 910 and the event source. Then, the FGC can determine a to-be-triggered action of travelling function graph 910 based on the mapping rule.

At operation 901, action 931 of state A 930 is executed and action 931 sends a payload carrying employee information to trigger a serverless function (e.g., employee function 932) for checking the status of the employee. Employee function 932 queries employee database (DB) 933 and sends a query response received from the employee DB 933 to state A 930 with the status of the employee carried in a payload of the query response. State A 930 maybe an operation state.

At operation 902, state A 930 passes the status of the employee carried in JSON payload to switch state B 940 of the travelling function graph 910.

At operation 903, switch state B 940 checks the status of the employee to determine whether the employee's travel has been approved. If the travel is not approved, the method goes to end state Z 980. If the travel is approved, the process goes to state C 950.

At operation 904, action 951 of state C 950 invokes a plurality of airline functions (952 and 953) for querying prices of available airlines (954 and 955) for the travel. A payload sent from state C 950 to the airline functions (952 and 953) may include preferred flight information. Each of airline functions (952 and 953) goes to a corresponding website for each of the airlines for querying the prices. The method goes to event state D.

At operation 905, action 961 of event state D 960 is executed. The definition of event expression of event state D 960 defines one or more events of inputs of the prices. Then, event state D 960 waits for the inputs of the prices. The websites/databases of airlines send price events to event state D 960 via gateway 962. The price events carry the prices provided by different airlines.

In one implementation, gateway 962 may combine price events from different websites/databases of airlines to a single payload of a combined event and sends the combined event to state D 960.

At operation 906, after receiving the prices from multiple airline websites/databases, action 961 of event state D 960 invokes price compare function 963 for comparing the received prices and receives information of a preferred flight from price compare function 963 according to the result of the comparison.

At operation 907, the method goes to state E 970. Action 971 of state E 970 invokes report travel plan function 972 to add travel plan to Booking Data Base (DB) 973, and reports the travel plan to the client.

At operation 908, the method goes to end state Z 980 and terminates travelling function graph 910.

In the embodiment of FIG. 9, the functions 932, 952, 953, 963 and 972 may serverless functions and be operated in the cloud 920. The employee DB 933 and booking DB may be located in the cloud 920.

Figure 10A:
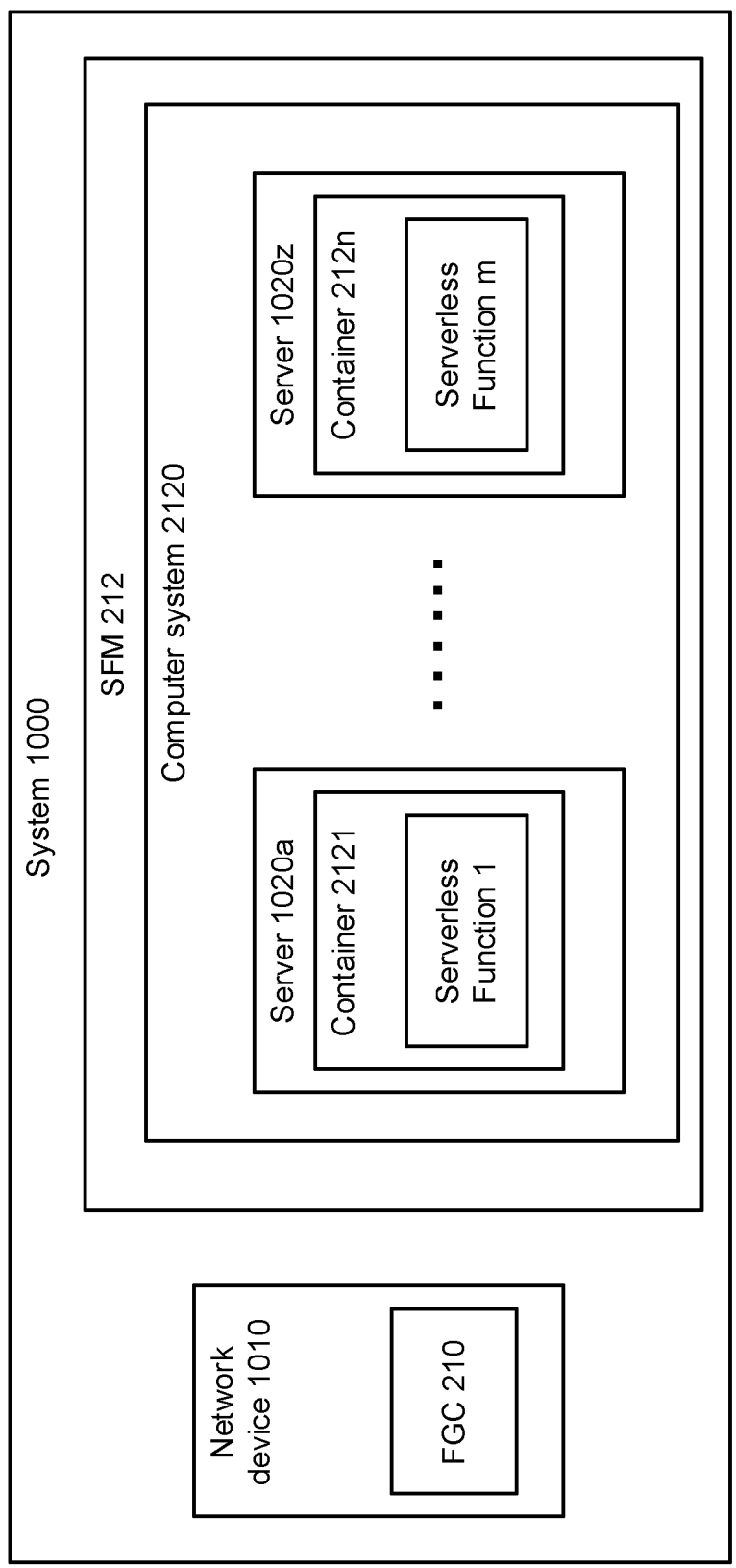
FIG. 10A illustrates an example of a system 1000 for coordinating execution of serverless functions.

FIG. 10A illustrates an example of system 1000 for coordinating execution of serverless functions. System 1000 comprises network device 1010 and a computer system 2120. As shown in the FIG. 10A, computer system 2120 may be included in serverless function manager (SFM) 212. Computer system 2120 may include a plurality of servers (1020a to 1020z). The network device performs the operations of the FGC 210.

Network device 1010 receives an event from an event source, and maps the received event to an event state of a function graph according to a mapping rule. The event state includes one or more actions, and the mapping rule indicates an expression identifying a relationship among an event, an event state of a function graph, and one or more actions of the event state.

Network device 1010 executes the one or more actions of the event state satisfying the mapping rule. Network device 1010 sends a data package of the event to computer system 2120 to initiate one or more computing resource groups for executing one or more serverless functions (function 1 to function m) associated with the one or more actions. The data package includes a payload, or metadata, or both.

The computing resource groups refer to units of computing resources which is used for deploying serverless functions corresponding to the actions of the event state. The units of computing resources are activated when the serverless functions are invoked, and the units of computing resources are released when the serverless functions are out of use. After the action of the event state triggers the serverless function, the unit of the computing resource will be initiated and occupies computing resources for deploying the serverless function. In one embodiment, the action of the event state sends a payload and/or metadata of received event to SFM 212 to initiate the unit of the computing resource. As shown in FIG. 10A, one example of units of computing resources are containers (2121 to 212n). There may be other kinds of units of computing resources, the embodiments of the containers do not limit the scope of the unit of computing resources.

In one embodiment, a container is a standard unit of software that packages up code and all its dependencies, so application can run quickly and reliably on the container. Containers are isolated from each other and bundle their own tools, libraries and configuration files. Containers can communicate with each other through well-defined channels. All containers may run by a single operating system kernel and are thus more lightweight than virtual machines. Containers are created from "images" that specify their precise contents. A container image is a lightweight, stand-alone, executable package of software that includes everything needed to run an application, for example, code, runtime, system tools, system libraries and settings.

A container image repository may be updated and managed based on application data, and the images in the container image repository may be used for container deploying.

In one embodiment, serverless Function Execution, which is not a regular function execution, may involve the following operations: automatically combine function code with a runtime, libraries, environment variables, and configuration files, build a container image, and automatically allocate computing resource that fits the size of the container image.

Network device 1010 receives one or more responses from one or more serverless functions in computer system 2120. Network device 1010 performs a next state of the function graph following the event state.

SFM 212 may manage the resource of computer system 2120 and the lifetime of the containers running on computer system 2120. In response to the execution of one or more actions of the event state, Network device 1010 sends request to SFM 212 to trigger the SFM 212 initiating containers on computer system 2120. Then, computer system 2120 runs container image to initiate one or more containers (2121 to 212n), and deploys one or more serverless functions (function 1 to function m) associated with the one or more actions on the one or more containers.

Network device 1010 is further configured to download one or more serverless functions from a repository, and deploy the one or more serverless functions on the initiated one or more containers.

Network device 1010 is further configured to release the one or more containers in response to the completion of the one or more serverless functions.

In one embodiment, referring to the FIG. 4A and FIG. 4B, payload or metadata during the processing of the function graph maybe filtered. For example, before sending the payload of the event from network device 1010 to computer system 2120, network device 1010 may filter the payload, and send a filtered payload to computer system 2120.

Figure 10B:
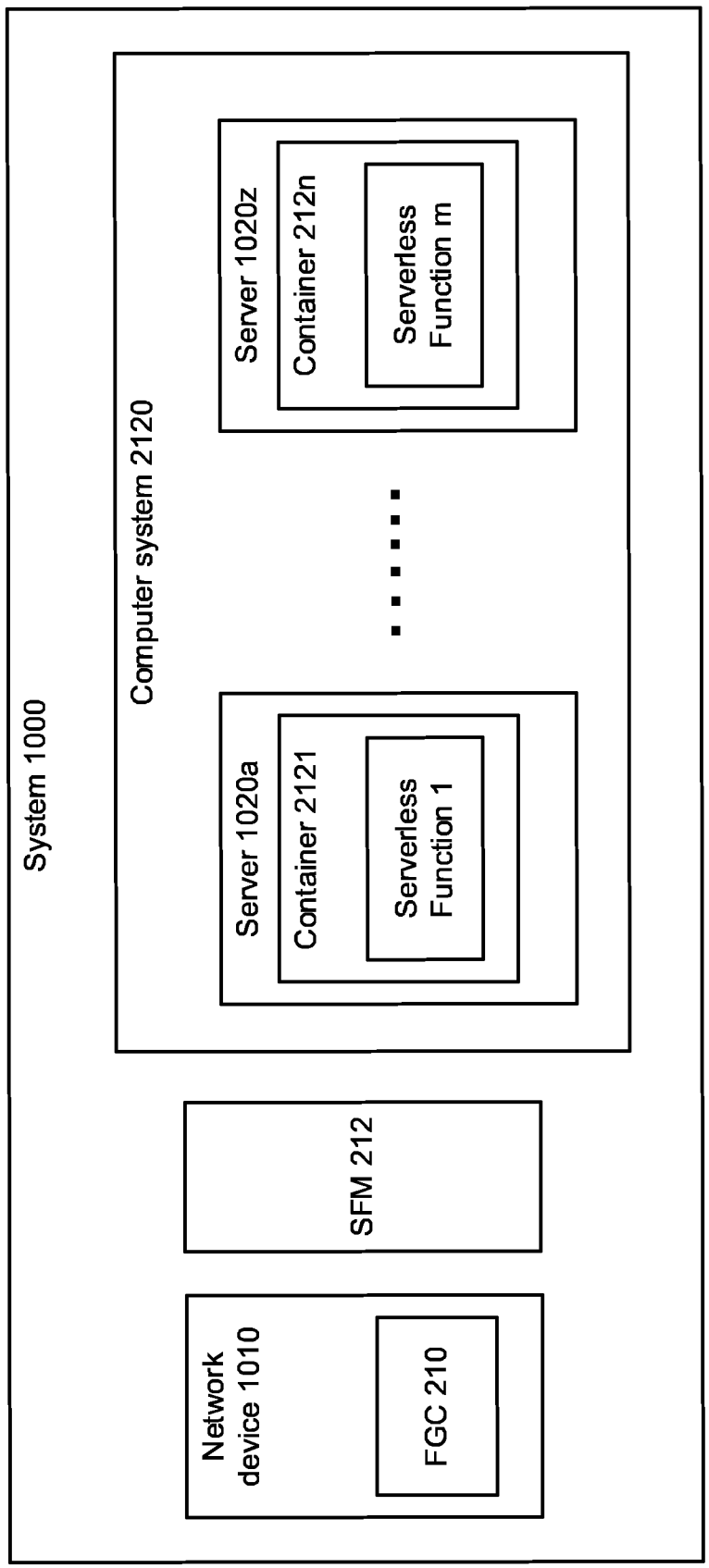
FIG. 10B illustrates another example of the system 1000.

FIG. 10B illustrates another example of system 1000, where computer system 2120 may be separated with SFM 212.

Figure 11:
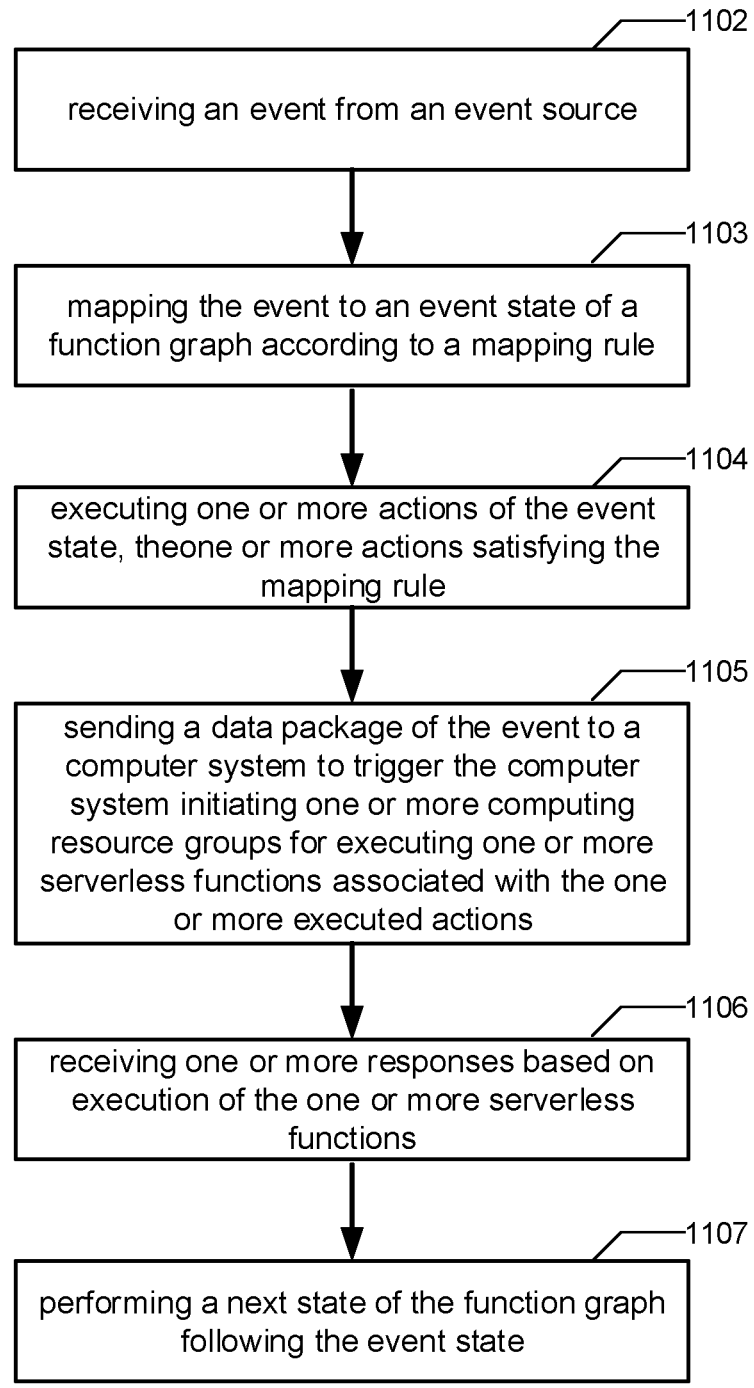
FIG. 11 illustrates a flow diagram for coordinating execution of serverless functions in accordance with the disclosed embodiment.

FIG. 11 illustrates a method for coordinating execution of serverless functions. A processor of network device receives an event from an event source at 1102. The event may include an event request carrying a payload. The processor of network device maps the event to an event state of a function graph according to a mapping rule. The event state may include one or more actions at 1103. Based on the received event, parts or all actions of the event state may satisfy the mapping rule. Then one or more actions of the event state which satisfy the mapping rule are executed at 1104. The processor of network device sends a data package of the event to a computer system to trigger the computer system initiating one or more computing resource groups for executing one or more serverless functions associated with the one or more executed actions at 1105. The processor of network device receives one or more responses based on execution of the one or more serverless functions at 1106, and performs a next state of the function graph following the event state at 1107. Hardware structure of the Network device in this embodiment may be the same with the network device shown in the FIG. 5D.

Figure 12:
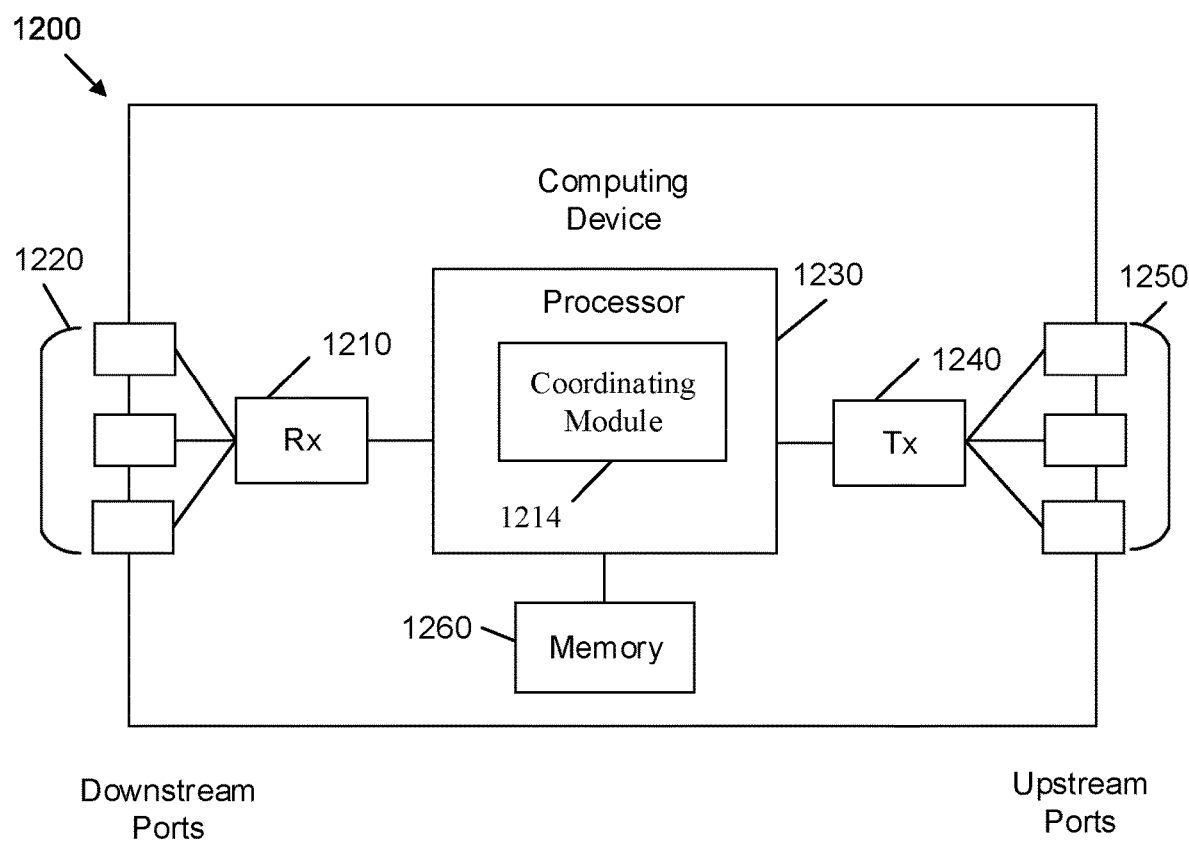
FIG. 12 illustrates a schematic diagram of an example computing device 1200 for coordinating execution of serverless functions

FIG. 12 is a schematic diagram of an example computing device 1200 for coordinating execution of serverless functions according to an embodiment of the disclosure. The computing device 1200 is suitable for implementing the disclosed embodiments as described herein. The computing device 1200 comprises ingress ports 1220 and receiver units (Rx) 1210 for receiving data; a processor, logic unit, or central processing unit (CPU) 1230 to process the data; transmitter units (Tx) 1240 and egress ports 1250 for transmitting the data; a memory 1260 for storing the data. The computing device 1200 may also comprise optical-to-electrical (OE) components and electrical-to-optical (EO) components coupled to the ingress ports 1220, the receiver units 1210, the transmitter units 1240, and the egress ports 1250 for egress or ingress of optical or electrical signals. The computing device 1200 may also include wireless transmitters and/or receivers in some examples.

The processor 1230 is implemented by hardware and software. The processor 1230 may be implemented as one or more CPU chips, cores (e.g., as a multi-core processor), field-programmable gate arrays (FPGAs), application specific integrated circuits (ASICs), and digital signal processors (DSPs). The processor 1230 is in communication with the ingress ports 1220, receiver units 1210, transmitter units 1240, egress ports 1250, and memory 1260. The processor 1230 comprises a coordinating module 1214. The coordinating module 1214 implements the disclosed embodiments described above. For instance, the coordinating module 1214 implements, processes, prepares, or provides the various operations in FIGS. 1-11. The inclusion of the coordinating module 1214 therefore provides a substantial improvement to the functionality of the computing device 1200 and effects a transformation of the computing device 1200 to a different state. Alternatively, the coordinating module 1214 is implemented as instructions stored in the memory 1260 and executed by the processor 1230 (e.g., as a computer program product stored on a non-transitory medium).

The memory 1260 comprises one or more disks, tape drives, and solid-state drives and may be used as an overflow data storage device, to store programs when such programs are selected for execution, and to store instructions and data that are read during program execution. The memory 1260 may be volatile and/or non-volatile and may be read-only memory (ROM), random access memory (RAM), ternary content-addressable memory (TCAM), and/or static random-access memory (SRAM). The computing device 1200 may also input/output (I/O) device for interacting with an end user. For example, the computing device 1200 may include a display, such as a monitor, for visual output, speakers for audio output, and a keyboard/mouse/trackball, etc. for user input.

The computing device 1200 may be implemented as Orchestration Server 110, Workflow Server 120, Application Server 130, Function Graph Controller 210, Serverless Function Manager 212, network device 1010, or anyone of server 1020a-1020z.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The computer-readable non-transitory media includes all types of computer readable media, including magnetic storage media, optical storage media, and solid state storage media and specifically excludes signals. It should be understood that the software can be installed in and sold with the device. Alternatively the software can be obtained and loaded into the device, including obtaining the software via a disc medium or from any manner of network or distribution system, including, for example, from a server owned by the software creator or from a server not owned but used by the software creator. The software can be stored on a server for distribution over the Internet, for example.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for coordinating execution of serverless functions, comprising:
   receiving, by a processor of a network device, an event from an event source;
   mapping, by the processor of the network device, the event to an event state of a plurality of event states in a function graph according to a mapping rule, the function graph including one or more actions for the event state, with each action of the one or more actions associated with execution of a serverless function;
   executing, by the processor of the network device, the one or more actions of the event state, the one or more actions satisfying the mapping rule;
   sending, by the processor of the network device, a data package of the event to a computer system to trigger the computer system initiating one or more computing resource groups for executing one or more serverless functions associated with the executed one or more actions;
   receiving, by the processor of the network device, one or more responses based on execution of the one or more serverless functions; and
   performing, by the processor of the network device, a next state of the function graph following the event state.

2. The method of claim 1, wherein the mapping rule indicates an expression identifying a relationship among the event, the event state of the plurality of event states in the function graph, and the one or more actions of the event state.

3. The method of claim 1, wherein the function graph includes at least one operation state allowing execution of the one or more serverless functions.

4. The method of claim 1, wherein the executing the one or more actions comprises:
   concurrently executing the actions of the event state, wherein each of the actions invokes a corresponding serverless function such that the data package of the event is passed to the serverless functions for execution.

5. The method of claim 1, wherein the executing the one or more actions comprises:
   sequentially executing the actions of the event state, wherein each of the actions invokes a corresponding serverless function,
   wherein the data package of the event is passed to a serverless function corresponding to a first action of the actions, and a data package of a response of the one or more responses from the serverless function corresponding to the first action is passed to another serverless function corresponding to a second action of the actions following the first action.

6. The method of claim 5, further comprising:
sending an event response to the event source from which the event originated upon completion of executing the one or more actions.

7. The method of claim 6, wherein the event response includes a data package from a last action of the sequentially executed actions of the event state.

8. The method of claim 6, further comprising:
combining multiple responses from the serverless functions corresponding to the actions of the event state into a single payload of the event response.

9. The method of claim 1, further comprising:
filtering contents of the data package based on filtering and transformation criteria before sending the data package to the one or more actions of the event state.

10. The method of claim 1, further comprising:
independently executing a subset of the one or more actions.

11. The method of claim 10, wherein one or more subsets are nested to define a combination of sequentially and concurrently executed one or more actions.

12. The method of claim 1, wherein the event state includes an expression of event definition which indicates a combination of one or more events as a trigger condition of the one or more actions of the event state.

13. The method of claim 12, wherein in response to a second event in the trigger condition not being received, a timeout occurs after a predetermined period of waiting time for the event.

14. A device for coordinating execution of serverless functions, comprising:
a non-transitory memory storage comprising instructions; and
one or more processors in communication with the non-transitory memory storage, wherein the one or more processors execute the instructions to:
receive an event from an event source;
map the event to an event state of a plurality of event states in a function graph according to a mapping rule, the function graph including one or more actions for the event state, with each action of the one or more actions associated with execution of a serverless function;
execute one or more actions of the event state, the one or more actions satisfying the mapping rule;
send a data package of the event to a computer system to trigger the computer system to initiate one or more computing resource groups for executing one or more serverless functions associated with the executed one or more actions;
receive one or more responses based on execution of the one or more serverless functions; and
perform a next state of the function graph following the event state.

15. The device of claim 14, wherein the one or more processors further execute the instructions to:
concurrently execute the actions of the event state, wherein each of the actions invokes a corresponding serverless function such that the data package of the event is passed to the serverless functions for execution.

16. The device of claim 14, wherein the one or more processors further execute the instructions to:
sequentially execute the actions of the event state, wherein each of the actions invokes a corresponding serverless function,
wherein the data package of the event is passed to a serverless function corresponding to a first action of the actions, and a data package of a response of the one or more responses from the serverless function corresponding to the first action is passed to another serverless function corresponding to a second action of the actions following the first action.

17. The device of claim 14, wherein the one or more processors further execute the instructions to:
send an event response to the event source from which the event originated upon completion of executing the one or more actions.

18. A non-transitory computer-readable medium storing computer instructions for coordinating execution of serverless functions, that when executed by one or more processors, cause the one or more processors to perform the steps of:
receiving an event from an event source;
mapping the event to an event state of a plurality of event states in a function graph according to a mapping rule, the function graph including one or more actions for the event state, with each action of the one or more actions associated with execution of a serverless function;
executing one or more actions of the event state, the one or more actions satisfying the mapping rule;
sending a data package of the event to a computer system to trigger the computer system to initiate one or more computing resource groups for executing one or more serverless functions associated with the executed one or more actions;
receiving one or more responses based on execution of the one or more serverless functions; and
performing a next state of the function graph following the event state.

19. A system for coordinating execution of serverless functions, comprising a network device and a computer system,
the network device, configured to:
receive an event from an event source;
map the event to an event state of a plurality of event states in a function graph according to a mapping rule, the function graph including one or more actions for the event state, with each action of the one or more actions associated with execution of a serverless function;
execute one or more actions of the event state, the one or more actions satisfying the mapping rule;
send a data package of the event to the computer system to trigger the computer system to initiate one or more computing resource groups for executing one or more serverless functions associated with the executed one or more actions;
receive one or more responses based on execution of the one or more serverless functions;
perform a next state of the function graph following the event state;
the computer system, configured to:
initiate one or more computing resource groups for executing the one or more serverless functions associated with the executed one or more actions; and
send one or more responses to the one or more actions of the event state in response to the execution of the one or more serverless functions.

20. The system according to the claim 19, wherein the computer system further configured to:
- download the one or more serverless functions from a repository; and
- deploy the one or more serverless functions on the initiated one or more computing resource groups.

21. The system according to the claim 20, wherein the computer system further configured to:
- release the one or more computing resource groups in response to the execution of the one or more serverless functions.

* * * * *